(12) United States Patent
Heimann et al.

(10) Patent No.: US 6,761,934 B2
(45) Date of Patent: Jul. 13, 2004

(54) ELECTROLESS PROCESS FOR TREATING METALLIC SURFACES AND PRODUCTS FORMED THEREBY

(75) Inventors: Robert L. Heimann, Centralia, MO (US); Brank Popov, Columbia, SC (US); Bruce Flint, Columbia, MO (US); Dragan Slavkov, Columbia, SC (US); Craig Bishop, Rock Hill, SC (US)

(73) Assignee: Elisha Holding LLC, Moberly, MO (US)

( * ) Notice: Subject to any disclaimer, the term of this patent is extended or adjusted under 35 U.S.C. 154(b) by 0 days.

(21) Appl. No.: 10/211,051

(22) Filed: Aug. 2, 2002

(65) Prior Publication Data

US 2003/0118861 A1 Jun. 26, 2003

Related U.S. Application Data

(60) Provisional application No. 60/381,024, filed on May 16, 2002, and provisional application No. 60/310,007, filed on Aug. 3, 2001.

(51) Int. Cl.⁷ .............................. B05D 1/18; B05D 3/00; B05D 3/02
(52) U.S. Cl. .................... 427/430.1; 427/327; 427/328; 427/435; 427/437; 427/443.1
(58) Field of Search ................................ 427/327, 328, 427/330, 430.1, 435, 436, 437, 443.1

(56) References Cited

U.S. PATENT DOCUMENTS

| | | | |
|---|---|---|---|
| 2,462,763 A | * 2/1949 | Nightingall et al. ........ 117/127 |
| 3,977,888 A | * 8/1976 | Sano et al. ..................... 106/74 |
| 4,908,075 A | * 3/1990 | Yamasoe ..................... 148/256 |
| 5,068,134 A | 11/1991 | Cole et al. ............... 427/376.2 |
| 5,108,793 A | * 4/1992 | Van Ooij et al. ........... 427/327 |
| 5,451,431 A | * 9/1995 | Purnell et al. .............. 427/387 |
| 5,455,080 A | * 10/1995 | Van Ooij ..................... 427/470 |
| 5,478,655 A | * 12/1995 | Sabata et al. ............... 428/469 |
| 5,487,919 A | 1/1996 | Tobiyama et al. .......... 427/327 |
| 5,714,093 A | * 2/1998 | Heimann et al. ...... 252/389.62 |
| 6,033,495 A | * 3/2000 | McGowan et al. ......... 148/279 |
| 6,143,420 A | * 11/2000 | Heimann et al. ........... 428/453 |

OTHER PUBLICATIONS

Corrosil CPS R Top Coat for Passivated Zinc & Zinc Alloys—Technical Information —ATOTECH USA Inc., Rock Hill, SC—Sheet No.: Corrosil CVS T Revision: 09/23/02T–494, (Sep. 2002).

Rogard Supreme Seal 500—Technical information—ATOTECH USA Inc., Rock Hill, SC—Sheet No.: ROGARD 500 Revision: 02/20/01T–1059, (Feb. 2001).

Preparation of Sillea Thin Films by Electrolyses of Aqueous Solution—Masaya Chigane. Masami Ishikawa. and Masanobu Izaki—Department of Inorganic Chemistry, Osaka Municipal Technical Research Institute, Joto–ku, Osaka 536–8553. Japan—Manuscript submitted Mar. 12, 2001: revised manuscript received Jun. 17, 2002. Available electronically Aug. 14, 2002 (pp. D9–D12).

* cited by examiner

Primary Examiner—Michael La Villa
(74) Attorney, Agent, or Firm—Michael K. Boyer

(57) ABSTRACT

The disclosure relates to a process for forming a deposit on the surface of a metallic or conductive surface. The process employs an electroless process to deposit a silicate containing coating or film upon a metallic or conductive surface.

28 Claims, 16 Drawing Sheets

OPEN CIRCUIT POTENTIAL

SEM & EDAX ANALYSIS OF SAMPLES RINSED IMMEDIATELY AND RINSED LATER
FIG. 8
RINSED IMMEDIATELY
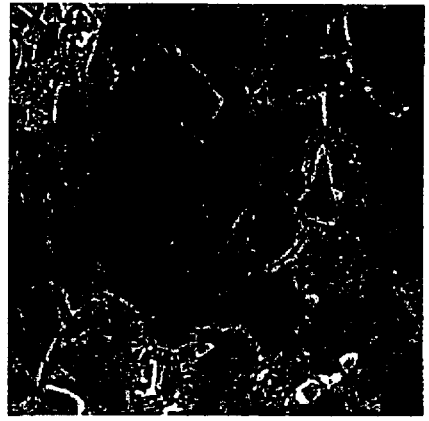
MAGNIFICATION—1000 X
| Elt. | LINE | INTENSITY (c/s) | ATOMIC % | CONC | |
|---|---|---|---|---|---|
| O | Kα | 0.73 | 0.000 | 0.000 | wt% |
| Si | Kα | 0.45 | 0.304 | 0.131 | wt% |
| Fe | Kα | 5.00 | 1.596 | 1.368 | wt% |
| Zn | Kα | 136.66 | 98.100 | 98.501 | wt% |
| | | | 100.00 | 100.000 | wt% |
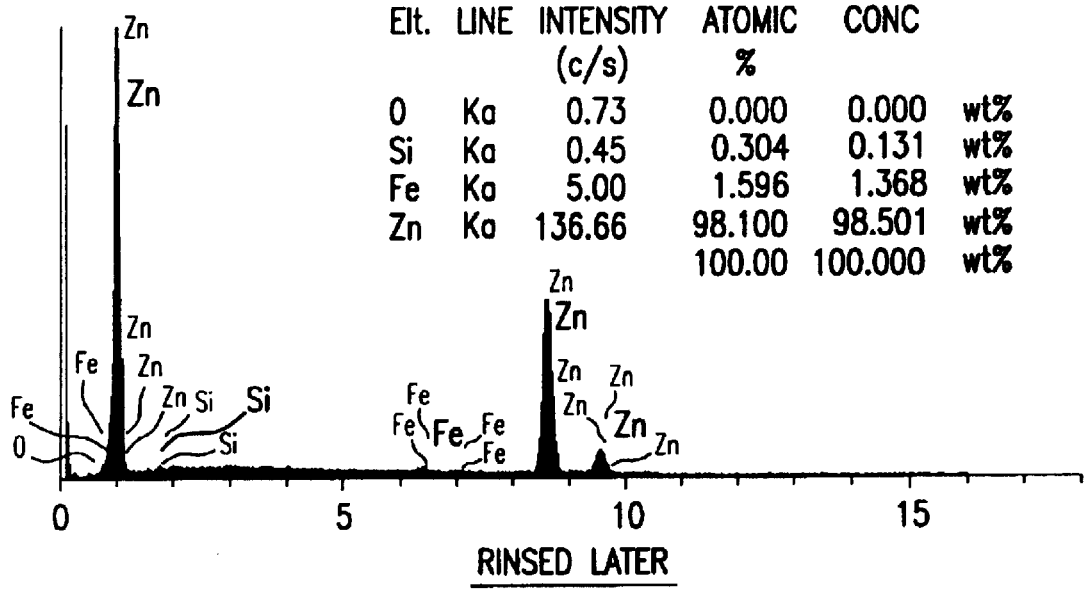
RINSED LATER
| Elt. | LINE | INTENSITY (c/s) | ATOMIC % | CONC | |
|---|---|---|---|---|---|
| O | Kα | 30.99 | 0.000 | 0.000 | wt% |
| Si | Kα | 106.90 | 23.630 | 11.753 | wt% |
| Fe | Kα | 9.66 | 1.128 | 1.116 | wt% |
| Zn | Kα | 308.01 | 75.242 | 87.131 | wt% |
| | | | 100.00 | 100.000 | wt% |
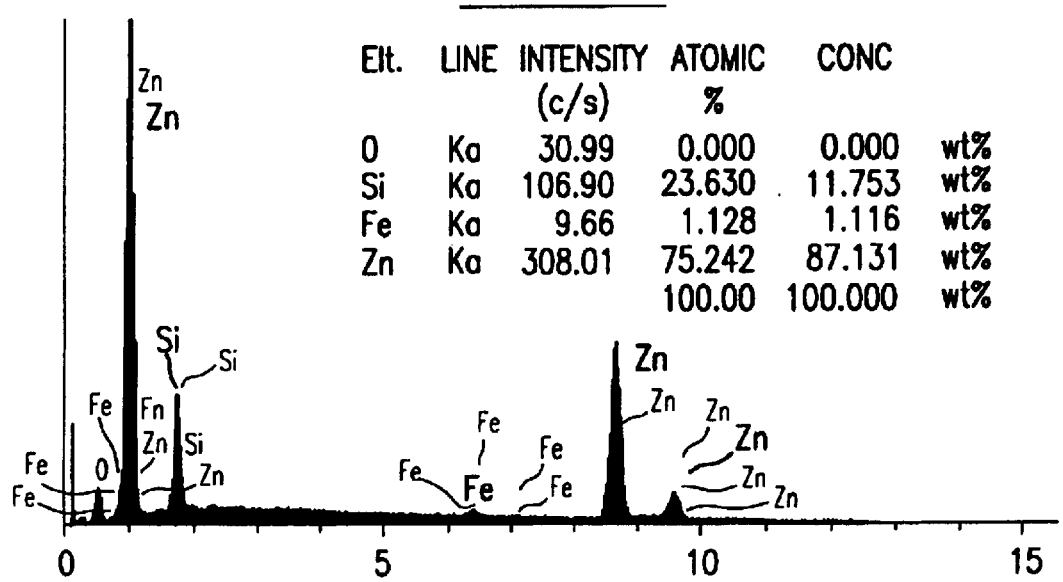

COMPARISON OF Si CONTENT FOR SAMPLES MINERALIZED IN 1:3 PQ SOLUTION WITH NO CURRENT AND WITH DIFFERENT AMOUNTS OF SODIUM BOROHYDRIDE

DROP IN CORROSION RESISTANCE FOR SAMPLES MINERALIZED IN 1:3 PQ SOLUTION WITH NO CURRENT AND WITH DIFFERENT AMOUNTS OF SODIUM BOROHYDRIDE
SAMPLES WERE DRIED IN AIR FOR 24 HOURS AND LEFT IN WATER FOR 1 WEEK

DROP IN CORROSION RESISTANCE FOR SAMPLES MINERALIZED
IN 1:3 PQ SOLUTION WITH NO CURRENT AND WITH DIFFERENT
AMOUNTS OF SODIUM BOROHYDRIDE SAMPLES WERE DRIED AT 175°C
FOR 1 HOUR AND LEFT IN WATER FOR 1 WEEK

CVs FOR SAMPLES MINERALIZED IN 1:3 PQ SOLUTION WITH NO CURRENT AND
WITH DIFFERENT AMOUNTS OF SODIUM BOROHYDRIDE
SAMPLES WERE DRIED IN THE AIR FOR 24 HOURS

INHIBITING EFFICIENCY OBTAINED FROM CVs FOR SAMPLES MINERALIZED IN 1:3 PQ SOLUTION WITH NO CURRENT AND WITH DIFFERENT AMOUNTS OF SODIUM BOROHYDRIDE SAMPLES WERE DRIED IN AIR FOR 24 HOURS

CVs FOR SAMPLES MINERALIZED IN 1:3 PQ SOLUTION WITH NO CURRENT AND WITH DIFFERENT AMOUNTS OF SODIUM BOROHYDRIDE SAMPLES WERE HEATED AT 175°C FOR 1 HOUR

INHIBITING EFFICIENCY OBTAINED FROM CVs FOR SAMPLES
MINERALIZED IN 1:3 PQ SOLUTION WITH NO CURRENT AND WITH
DIFFERENT AMOUNTS OF SODIUM BOROHYDRIDE
SAMPLES WERE HEATED AT 175°C FOR 1 HOUR

CVs FOR SAMPLES MINERALIZED IN 1:3 PQ SOLUTION WITH NO
CURRENT AND WITH DIFFERENT AMOUNTS OF SODIUM BOROHYDRIDE
SAMPLES WERE DRIED IN AIR FOR 24 HOURS AND LEFT IN WATER
FOR 1 WEEK

CHANGE IN THE INHIBITING EFFICIENCY FOR SAMPLES MINERALIZED IN 1:3 PQ SOLUTION WITH NO CURRENT AND WITH DIFFERENT AMOUNTS OF SODIUM BOROHYDRIDE SAMPLES WERE DRIED IN AIR FOR 24 HOURS AND LEFT IN WATER FOR 1 WEEK

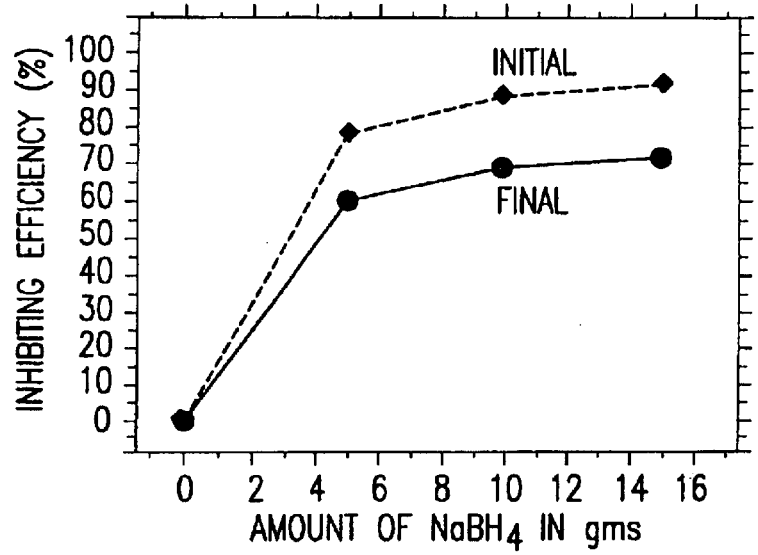

FIG.17

CVs FOR SAMPLES MINERALIZED IN 1:3 PQ SOLUTION WITH NO CURRENT AND WITH DIFFERENT AMOUNTS OF SODIUM BOROHYDRIDE SAMPLES WERE DRIED AT 175°C FOR 1 HOUR AND LEFT IN WATER FOR 1 WEEK

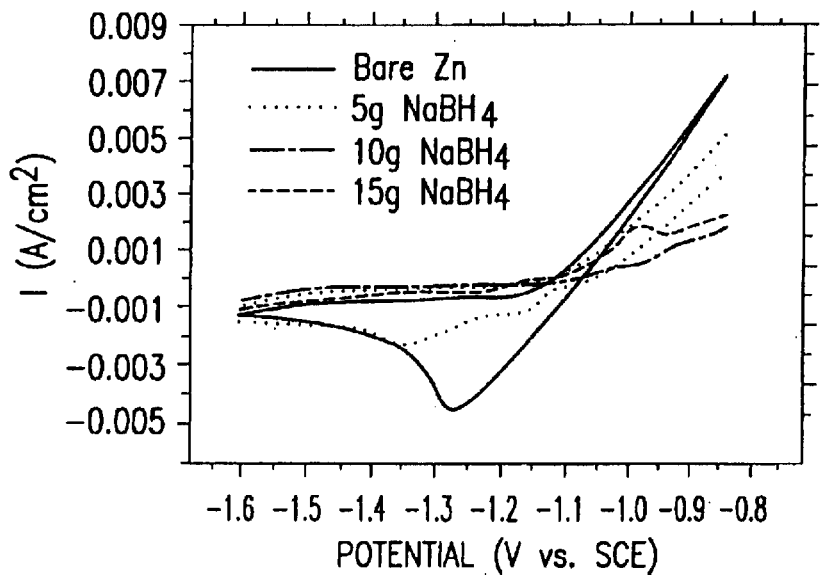

FIG.18

Change in Morphology for sample mineralized in 1:3 PQ solution with no current and with 10g/L of sodium Borohydride
Samples were heated at 175° C for 1 hour.
Before Corrosion
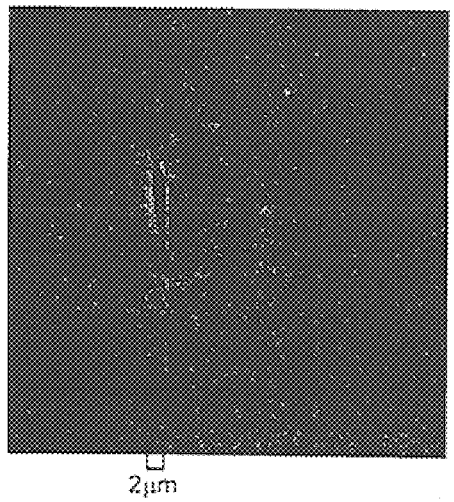
2μm
Magnification:2000X
After Corrosion
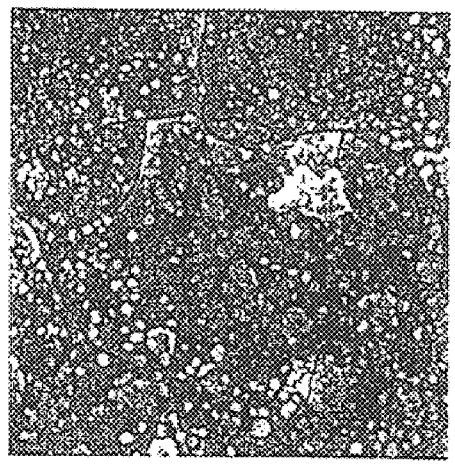
Magnification:500X
FIG.20

ELECTROLESS PROCESS FOR TREATING METALLIC SURFACES AND PRODUCTS FORMED THEREBY

The subject matter herein claims benefit of previously filed U.S. Patent Application Serial No. 60/381,024, filed on May 16, 2002 and 60/310,007, filed on Aug. 3, 2002, both entitled "An Electroless Process For Treating Metallic Surfaces And Product Formed Thereby"; the disclosure of both is hereby incorporated by reference.

FIELD OF THE INVENTION

The instant invention relates to a process for forming a deposit on the surface of a metallic or conductive surface. The process employs a process to deposit, for example, a mineral containing coating or film upon a metallic, metal containing or an electrically conductive surface.

BACKGROUND OF THE INVENTION

Silicates have been used in electrocleaning operations to clean steel, tin, among other surfaces. Electrocleaning is typically employed as a cleaning step prior to an electroplating operation. Usage of silicates as cleaners is described in "Silicates As Cleaners In The Production of Tinplate" is described by L. J. Brown in February 1966 edition of *Plating*; European Patent No. 00536832/EP B1 (Metallgesellschaft AG); U.S. Pat. Nos. 5,902,415, 5,352,296 and 4,492,616.

Processes for electrolytically forming a protective layer or film by using an anodic method are disclosed by U.S. Pat. No. 3,658,662 (Casson, Jr. et al.), and United Kingdom Patent No. 498,485.

U.S. Pat. No. 5,352,342 to Riffe, which issued on Oct. 4, 1994 and is entitled "Method And Apparatus For Preventing Corrosion Of Metal Structures" that describes using electromotive forces upon a zinc solvent containing paint; hereby incorporated by reference. U.S. Pat. Nos. 5,700,523, and 5,451,431; and German Patent No. 93115628 describes a processes for using alkaline metasilicates to treat metallic surfaces.

The disclosure of the previously identified patents and publications is hereby incorporated by reference.

SUMMARY OF THE INVENTION

The instant invention solves problems associated with conventional practices by providing an electroless process for treating metallic surfaces. By "electroless" it is meant that no current is applied from an external source (a current may be generated in-situ due to an interaction between the metallic surface and the medium). The process employs a silicate medium having a controlled and predetermined silicate concentration, temperature and pH. As a result, the silicate medium that interacts with the metallic surface to form surface having one or more improved properties. The inventive process controls the medium's characteristics and the surrounding environment in order to obtain a desired film or layer upon the metal surface, e.g, a film or layer having low surface porosity or high density. The characteristics of the film or layer can be controlled or modified by varying the temperature, pH, lattice builders (i.e., medium dopants), rate of formation, heat, pressure, pre and post treatments and silicate concentration.

The inventive process can form a surface comprising a mineral layer comprising an amorphous matrix surrounding or incorporating metal silicate crystals upon the substrate. The characteristics of the mineral layer are described in greater detail in the copending and commonly assigned patent applications listed below.

A metallic surface that is treated (e.g., forming the mineral layer) by the inventive process can possess improved corrosion resistance, increased electrical resistance, heat resistance, flexibility, resistance to stress crack corrosion, adhesion to topcoats, among other properties. The improved heat resistance broadens the range of processes that can be performed subsequent to forming the inventive layer, e.g., heat cured topcoatings, stamping/shaping, riveting, among other processes. The treated surface also imparts greater corrosion resistance (e.g., ASTM B-117), among other beneficial properties, than conventional tri-valent or hexa-valent chromate systems. The inventive process can provide a zinc-plate article having an ASTM B-117 resistance to white rust of at least about 96 hours (and normally greater than about 150 hours), and resistance to red rust of at least about 250 (and normally greater than about 400 hours). The corrosion resistance can be improved by adding a dopant to the silicate medium, using a rinse and/or applying at least one sealer/topcoating.

The inventive process is a marked improvement over conventional methods by obviating the need for solvents or solvent containing systems to form a corrosion resistant layer, e.g., a mineral layer. In contrast, to conventional methods the inventive process can be substantially solvent free. By "substantially solvent free" it is meant that less than about 5 wt. %, and normally less than about 1 wt. % volatile organic compounds (V.O.C.s) are present in the electrolytic environment.

The inventive process is also a marked improvement over conventional methods by reducing, if not eliminating, chromate and/or phosphate containing compounds (and issues attendant with using these compounds such as waste disposal, worker exposure, among other undesirable environmental impacts). While the inventive process can be employed to enhance chromated or phosphated surfaces, the inventive process can replace these surfaces with a more environmentally desirable surface. The inventive process, therefore, can be "substantially chromate free" and "substantially phosphate free" and in turn produce articles that are also substantially chromate (hexavalent and trivalent) free and substantially phosphate free. The inventive process can also be substantially free of heavy metals such as chromium, lead, cadmium, barium, among others. By substantially chromate free, substantially phosphate free and substantially heavy metal free it is meant that less than 5 wt. % and normally about 0 wt. % chromates, phosphates and/or heavy metals are present in a process for producing an article or the resultant article.

CROSS REFERENCE TO RELATED PATENTS AND PATENT APPLICATIONS

The subject matter of the instant invention is related to commonly assigned Non-Provisional U.S. patent application Ser. No. 09/814,641, filed on Mar. 22, 2001 and entitled "An Energy Enhanced Process For Treating a Conductive Surface and Products Formed Thereby"; Ser. No. 08/850,323, filed on May 2, 1997 and entitled "Corrosion Resistant Coatings Containing An Amorphous Phase" (Now U.S. Pat. No. 6,165,257); Ser. No. 08/850,586, filed on May 2, 1997 and entitled "Corrosion Resistant Coatings Containing an Amorphous Phase" (Now U.S. Pat. No. 6,143,420); Ser. No. 09/016,853, filed on Jan. 30, 1998 and entitled "Corrosion Resistant Coatings Containing An Amorphous Phase" (Now U.S. Pat. No. 6,190,779); Ser. No. 08/791,337, filed on May 31, 1997 and entitled "Corrosion Resistant Coatings Containing An Amorphous Phase" (now U.S. Pat. No. 5,938, 976), Ser. No. 08/634,215, filed on Apr. 18, 1996, and entitled "Corrosion Resistant Buffer System for Metal Products", Ser. No. 08/476,271 filed on Jun. 7, 1995 and entitled "Corrosion Resistant Buffer System For Metal Products"; and Ser. No. 08/327,438, filed on Oct. 21, 1994 and entitled "Corrosion Resistant Buffer System For Metal Products, now U.S. Pat. No. 5,714,093.

The subject matter of this invention is related to Non-Provisional patent application Ser. No. 09/016,849, filed on Jan. 30, 1998 and entitled "Corrosion Protective Coatings". The subject matter of this invention is also related to Non-Provisional patent application Ser. No. 09/016,462, filed on Jan. 30, 1998 and entitled "Aqueous Gel Compositions and Use Thereof" (now U.S. Pat. No. 6,033,495).

The subject matter of this invention is also related to Non-Provisional patent application Ser. No. 09/814,641, filed on Mar. 22, 2001, and entitled "An Energy Enhanced Process For Treating A Conductive Surface And Products Formed Thereby", and Non-Provisional patent application Ser. No. 10/211,029, filed on Aug. 3, 2002 and entitled "An Electrolytic And Electroless Process For Treating Metallic Surfaces And Products Formed Thereby", and Ser. No. 10/211,094, filed on Aug. 3, 2002 and entitled "Process For Treating A Conductive Surface And Products Formed Thereby".

The disclosure of the previously identified patents, patent applications and publications is hereby incorporated by reference.

BRIEF DESCRIPTION OF THE DRAWINGS

FIG. 8 illustrates a comparison of the SEM and EDAX analysis of samples exposed to the inventive medium and rinsed immediately and rinsed after 24 hours.

FIG. 17 illustrates inhibiting efficiencies based upon the voltagrams of FIG. 16.

FIG. 18 illustrates the affect on inhibiting efficiencies on air dried samples after immersion in water for one week.

FIG. 20 illustrates an SEM image of samples treated with the inventive medium with sodium borohydride addition before and after immersion in water.

DETAILED DESCRIPTION

Figure 1:
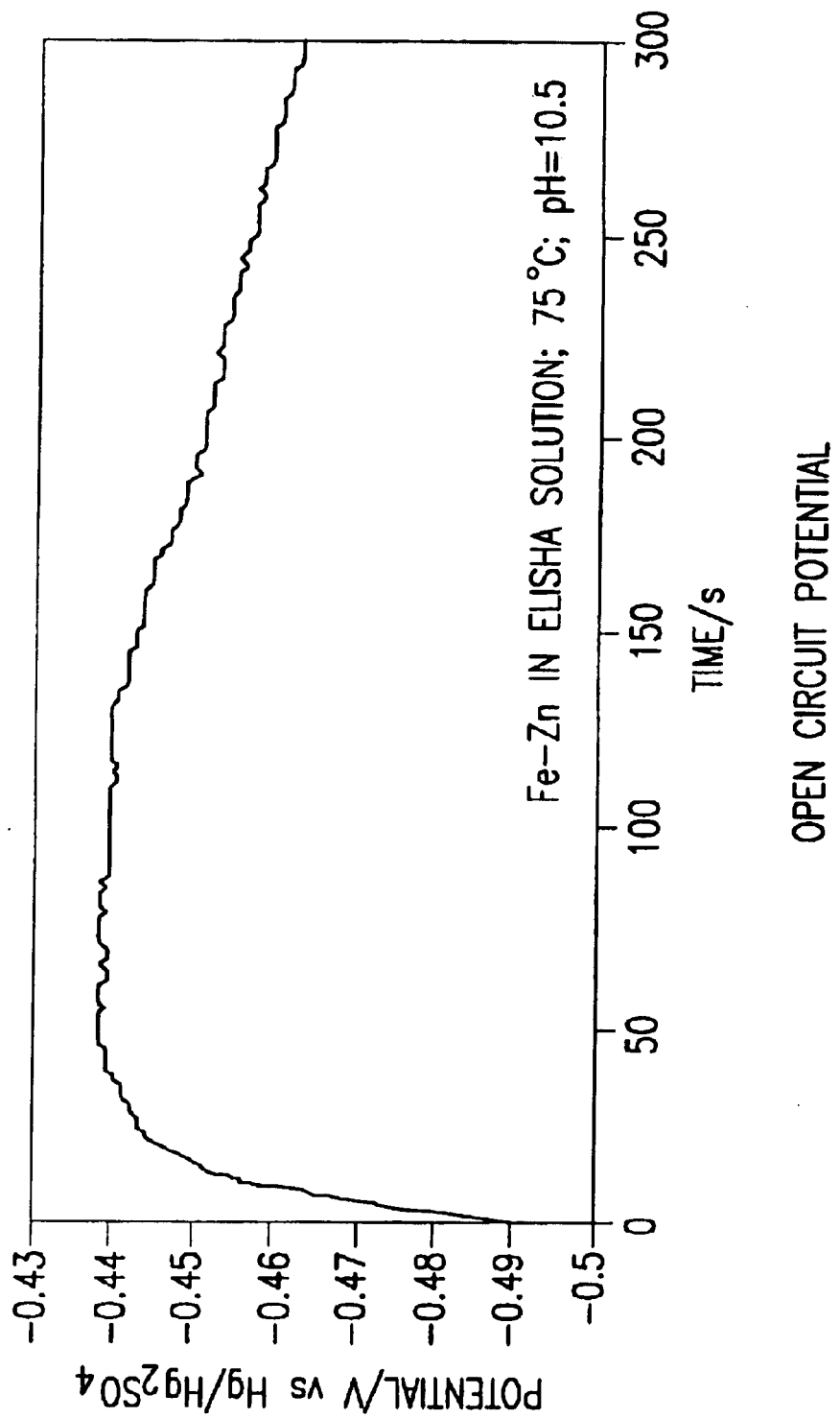
FIG. 1 illustrates the open-circuit potential of galvanized steel panels immersed in the inventive medium having a pH 10.5.

The instant invention relates to a process for depositing or forming a beneficial surface (e.g., a mineral containing coating or film) upon a metallic surface. The process contacts at least a portion of a metal surface with a silicate medium, e.g., containing soluble mineral components or precursors thereof, having controlled and predetermined silicate concentration, temperature and pH. By "mineral containing coating", "mineralized film" or "mineral" it is meant to refer to a relatively thin coating or film which is formed upon a metal surface wherein at least a portion of the coating or film comprises at least one metal containing mineral, e.g., an amorphous phase or matrix surrounding or incorporating crystals comprising a zinc disilicate. Mineral and Mineral Containing are defined in the previously identified Cross Reference To Related Patents and Paten Applications; incorporated by reference.

By "metal containing", "metal", or "metallic", it is meant to refer to sheets, shaped articles, fibers, rods, particles, continuous lengths such as coil and wire, metallized surfaces, among other configurations that are based upon at least one metal and alloys including a metal having a naturally occurring, or chemically, mechanically or thermally modified surface. Typically a naturally occurring surface upon a metal will comprise a thin film or layer comprising at least one oxide, hydroxides, carbonates, sulfates, chlorides, among others. The naturally occurring surface can be removed or modified by using the inventive process.

The metal surface refers to a metal article or body as well as a non-metallic member having an adhered metal or conductive layer. While any suitable surface can be treated by the inventive process, examples of suitable metal surfaces comprise at least one member selected from the group consisting of galvanized surfaces, sheradized surfaces, zinc, iron, steel, brass, copper, nickel, tin, aluminum, lead, cadmium, magnesium, alloys thereof such as zinc-nickel alloys, tin-zinc alloys, zinc-cobalt alloys, zinc-iron alloys, among others. If desired, the mineral layer can be formed on a non-conductive substrate having at least one surface coated with a metal, e.g., a metallized polymeric article or sheet, ceramic materials coated or encapsulated within a metal, among others. Examples of metallized polymer comprise at least one member selected from the group of polycarbonate, acrylonitrile butadiene styrene (ABS), rubber, silicone, phenolic, nylon, PVC, polyimide, melamine, polyethylene, polyproplyene, acrylic, fluorocarbon, polysulfone, polyphenyene, polyacetate, polystyrene, epoxy, among others. Conductive surfaces can also include carbon or graphite as well as conductive polymers (polyaniline for example).

The metal surface can possess a wide range of sizes and configurations, e.g., fibers, coils, sheets including perforated acoustic panels, chopped wires, drawn wires or wire strand/rope, rods, couplers (e.g., hydraulic hose couplings), fibers, particles, fasteners (including industrial and residential hardware), brackets, nuts, bolts, rivets, washers, cooling fins, stamped articles, powdered metal articles, among others. The limiting characteristic of the inventive process to treat a metal surface is dependent upon the ability of the surface to be contacted with the inventive silicate medium.

The inventive process can be operated on a batch or continuous basis. The type of process will depend upon the configuration of the metal being treated. The contact time within the silicate medium ranges from about 10 seconds to about 50 minutes and normally about 1 to about 15 minutes. The inventive process can be practiced in any suitable apparatus. Examples of suitable apparatus comprise a batch process performed in polyproplyene tanks having means for circulating the silicate medium and maintaining a predetermined temperature.

The silicate containing medium can be a fluid bath, gel, spray, fluidized beds, among other methods for contacting the substrate with the silicate medium. Examples of the silicate medium comprise a bath containing at least one silicate, a gel comprising at least one silicate and a thickener, among others. The medium can comprise a bath comprising at least one of potassium silicate, calcium silicate, lithium silicate, sodium silicate, ammonium silicate, compounds releasing silicate moieties or species, among other silicates. The bath can comprise any suitable polar or non-polar carrier such as water, alcohol, ethers, carboxillic acids, among others. Normally, the bath comprises at least one water-soluble silicate such as sodium silicate and de-ionized water and optionally at least one dopant (e.g. chlorides among other monovalent species). Typically, the at least one dopant is water soluble or dispersible within an aqueous medium.

The silicate containing medium typically has a basic pH. Normally, the pH will range from greater than about 9 to about 13 and typically, about 10 to about 12. The pH of the medium can be monitored and maintained by using conventional detection and delivery methods. The selected detection method should be reliable at relatively high sodium concentrations and under ambient conditions.

The silicate medium is normally aqueous and can comprise at least one water soluble or dispersible silicate in an amount from greater than about 0 to about 40 wt. %, usually, about 1 to 15 wt. % and typically about 3 to 8 wt. %. The amount of silicate in the medium should be adjusted to accommodate silicate sources having differing concentrations of silicate. The silicate containing medium is also normally substantially free of heavy metals, chromates and/or phosphates.

The silicate medium can be modified by adding at least one stabilizing compound (e.g., stabilizing by complexing metals). An example of a suitable stabilizing compound comprises phosphines, sodium citrate, ammonium citrate, ammonium iron citrate, sodium salts of ethylene diamine tetraacetic acid (EDTA) and nitrilotriacetic acid (NTA), 8-hydroxylquinoline, 1,2-diaminocyclohexane-tetracetyic acid, diethylene-triamine pentacetic acid, ethylenediamine tetraacetic acid, ethylene glycol bisaminoethyl ether tetraacetic acid, ethyl ether diaminetetraacetic acid, N'-hydroxyethylethylenediamine triacetic acid, 1-methyl ethylene diamine tetraacetic acid, nitriloacetic acid, pentaethylene hexamine, tetraethylene pentamine, triethylene tetraamine, among others.

In one aspect, the silicate medium has a basic pH and comprises at least one water soluble silicate, water and colloidal silica. The silicate medium can also be modified by adding colloidal particles such as colloidal silica (commercially available as Ludox® AM-30, HS-40, among others). The colloidal silica has a particle size ranging from about 10 nm to about 50 nm. The size of particles in the medium ranges from about 10 nm to 1 micron and typically about 0.05 to about 0.2 micron. The medium has a turbidity of about 10 to about 700, typically about 50 to about 300 Nephelometric Turbidity Units (NTU) (as determined in accordance with conventional procedures).

The temperature of the silicate medium can be controlled to optimize the interaction between the medium and a metal surface. Normally, the temperature will range from about 50 to at least about 100 C. and typically about 50 to 100 C. (e.g., 55 C.). This temperature can be maintained by using conventional heaters and related control systems. If desired, the metal surface can be heated prior to being introduced into the medium.

The chemical and/or physical properties of the silicate medium can be affected by exposing the medium to a source of electrical or magnetic energy. For example, the bath can be exposed to a source of energy such as the electrical current described in aforementioned U.S. Ser. No. 09/814,641; hereby incorporated by reference. Such exposure can improve the interaction between the medium and the metal surface, partially polymerize the silicate medium, partially crystallize the silicate medium, among other affects.

The silicate medium can be modified by adding water/polar carrier dispersible or soluble polymers. If utilized, the amount of polymer or water dispersible materials normally ranges from about 0 wt. % to about 10 wt. %. Examples of polymers or water dispersible materials that can be employed in the silicate medium comprise at least one member selected from the group of acrylic copolymers (supplied commercially as Carbopol®), zirconyl ammonium carbonate, hydroxyethyl cellulose, clays such as bentonite, fumed silica, solutions comprising sodium silicate (supplied commercially by MacDermid as JS2030S), among others. A suitable composition can be obtained in an aqueous composition comprising about 3 wt % silicate (obtained from N-grade Sodium Silicate Solution (PQ Corp) that comprises 25% silicate), optionally about 0.5 wt % Carbopol EZ-2 (BF Goodrich), about 5 to about 10 wt. % fumed silica, mixtures thereof, among others.

In an aspect of the invention, the silicate medium is modified to include at least one dopant material. The dopants can be useful for building additional thickness of the deposited layer, hydroxides of iron, aluminum, manganise, and magnesium among others. The amount of dopant can vary depending upon the properties of the dopant and desired results. Typically, the amount of dopant will range from about 0.001 wt. % to about 5 wt. % of the medium (or greater so long as the deposition rate is not adversely affected). Examples of suitable dopants comprise at least one member selected from the group of water dispersible or soluble salts, oxides and precursors of tungsten, molybdenum (e.g., molybdenum chloride), titanium (titatantes), zircon, vanadium, phosphorus, aluminum (e.g., aluminates, aluminum chloride, etc), iron (e.g., iron chloride), boron (borates), bismuth, cobalt (e.g., cobalt chloride, cobalt oxide, etc.), gallium, tellurium, germanium, antimony, niobium (also known as columbium), magnesium and manganese, nickel (e.g., nickel chloride, nickel oxide, etc.), sulfur, zirconium (zirconates) mixtures thereof, among others, and usually, salts and oxides of aluminum and iron, and hydroxides of iron, aluminum, manganese and magnesium, among others; and other water soluble or dispersible monovalent species. The dopant can comprise at least one of molybdenic acid, fluorotitanic acid and salts thereof such as titanium hydrofluoride, ammonium fluorotitanate, ammonium fluorosilicate and sodium fluorotitanate; fluorozirconic acid and salts thereof such as $H_2ZrF_6$, $(NH_4)_2ZrF_6$ and $Na_2ZrF_6$; among others. Alternatively, dopants can comprise at least one substantially water insoluble material such as electropheritic transportable polymers, PTFE, boron nitride, silicon carbide, silicon nitride, aluminum nitride, titanium carbide, diamond, titanium diboride, tungsten carbide, silica (e.g., colloidal silica available commercially as Ludox® AM and HS) metal oxides such as cerium oxide, powdered metals and metallic precursors such as zinc, among others.

If desired, the dopant can be dissolved or dispersed without another medium prior to introduction into the silicate medium. For example, at least one dopant can be combined with a basic compound, e.g., sodium hydroxide, and then added to the silicate medium. Examples of dopants that can be combined with another medium comprise zirconia, cobalt oxide, nickel oxide, molybdenum oxide, titanium (IV) oxide, niobium (V) oxide, magnesia, zirconium silicate, alumina, antimony oxide, zinc oxide, zinc powder, aluminum powder, among others.

The aforementioned dopants that can be employed for enhancing mineral layer formation rate, modifying the chemistry and/or physical properties of the resultant layer, as a diluent for the silicate containing medium, among others. Examples of such dopants are iron salts (ferrous chloride, sulfate, nitrate), aluminum fluoride, fluorosilicates (e.g., K2SiF6), fluoroaluminates (e.g., potassium fluoroaluminate such as K2AlF5-H2O), mixtures thereof, among other sources of metals and halogens. The dopant materials can be introduced to the metal surface in pretreatment steps, in post treatment steps (e.g., rinse), and/or by alternating exposing the metal surface to solutions of dopants and solutions of silicates if the silicates will not form a stable solution with the dopants, e.g., one or more water soluble dopants. The presence of dopants in the silicate medium can be employed to form tailored surfaces upon the metal, e.g., an aqueous sodium silicate solution containing aluminate can be employed to form a layer comprising oxides of silicon and aluminum. That is, at least one dopant (e.g., zinc) can be co-deposited along with at least one siliceous species (e.g., a mineral) upon the substrate.

The silicate medium can also be modified by adding at least one diluent. Examples of suitable diluent comprise at least one member selected from the group of sodium sulphate, surfactants, de-foamers, colorants/dyes, conductivity modifiers, among others. The diluent (e.g., sodium sulfate) can be employed for reducing the affects of contaminants entering the silicate medium, reducing bath foam, among others. When the diluent is employed as a defoamer, the amount normally comprises less than about 5 wt. % of the medium, e.g., about 1 to about 2 wt. %.

According to one embodiment of the invention, the silicate medium further comprises at least one reducing agent. An example of a suitable reducing agent comprises sodium borohydride, phosphorus compounds such as hypophosphide compounds, phosphate compounds, among others. Without wishing to be bound by any theory or explanation, it is believed that the reducing agent may reduce water present in the silicate medium thereby modifying the surface pH of articles that contact the silicate medium (e.g., article may induce or catalyze activity of the reducing agent). According to one embodiment, the concentration of sodium borohydride is typically 1 gram per liter of bath solution to about 20 grams per liter of bath solution more typically 5 grams per liter of bath solution to about 15 gram per liter of bath solution. In one illustrative and preferred embodiement, 10 grams of sodium borohydride per liter of bath solution is utilized. When employed the reducing agent, can cause hydrogen evolution once the bath/medium has been sufficiently heated.

Contact with the inventive silicate medium can be preceded by and/or followed with conventional pre-treatments and/or post-treatments known in this art such as cleaning or rinsing, e.g., immersion/spray within the treatment, sonic cleaning, double counter-current cascading flow; alkali or acid treatments, among other treatments. By employing a suitable post-treatment the solubility, corrosion resistance (e.g., reduced white rust formation when treating zinc containing surfaces), sealer and/or topcoat adhesion, among other properties of surface of the substrate formed by the inventive method can be improved. If desired, the post-treated surface can be sealed, rinsed and/or topcoated, e.g., silane, epoxy, latex, fluoropolymer, acrylic, titanates, zirconates, carbonates, urethanes, among other coatings.

In one aspect of the invention, a pre-treatment comprises exposing the substrate to be treated to at least one of an acid, base (e.g., zincate solution), oxidizer, among other compounds. The pre-treatment can be employed for cleaning oils, removing excess oxides or scale, equipotentialize the surface for subsequent mineralization treatments, convert the surface into a mineral precursor, functionalize the surface (e.g., a hydroxilized surface), among other benefits. Conventional methods for acid cleaning metal surfaces are described in ASM, Vol. 5, Surface Engineering (1994), and U.S. Pat. No. 6,096,650; hereby incorporated by reference.

In one aspect of the invention, the metal surface is pre-treated or cleaned electrolytically by being exposed to an anodic environment. That is, the metal surface is exposed to the silicate medium wherein the metal surface is the anode and a current is introduced into the medium. By using the metal as the anode in a DC cell and maintaining a current of about 10 A/ft2 to about 150 A/ft2, the process can generate oxygen gas. The oxygen gas agitates the surface of the workpiece while oxidizing the substrate's surface. The surface can also be agitated mechanically by using conventional vibrating equipment. If desired, the amount of oxygen or other gas present during formation of the mineral layer can be increased by physically introducing such gas, e.g., bubbling, pumping, among other means for adding gases.

If desired, the inventive method can include a thermal post-treatment. The metal surface can be removed from the silicate medium, dried (e.g., at about 100 to 150 C. for about 2.5 to 10 minutes), rinsed in deionized water and then dried in order to remove rinse water. This is in contrast to conventional metal treatments that rinse(s) and then dry. The dried surface may be processed further as desired; e.g. contacted with a sealer, rinse or topcoat. If desired, the rinse can comprise a reactive component such as a silane, carbonate, zirconate, colloidal silica, among other compounds that interact with the treated metallic surface.

In aspect of the invention, the thermal post treatment comprises heating the surface. Typically the amount of heating is sufficient to consolidate or densify the inventive surface without adversely affecting the physical properties of the underlying metal substrate. Heating can occur under atmospheric conditions, within a nitrogen containing environment, among other gases. Alternatively, heating can occur in a vacuum. The surface may be heated to any temperature within the stability limits of the surface coating and the surface material. Typically, surfaces are heated from about 75° C. to about 250° C., more typically from about 150° C. to about 200° C. If desired, the heat treated component can be rinsed in water to remove any residual water soluble species and then dried again (e.g., at a temperature and time sufficient to remove water).

If desired, prior to heating the inventive surface can be contacted with a solution containing a material that reacts with the surface at elevated temperatures, e.g., a eutectic formed between silica and at least one of $Al_2O_3$, $B_2O_3$, $Fe_2O_3$, MgO, phosphates, among others. Normally, the heating will be sufficient to cause sintering or a desirable interaction without adversely affecting the underlying metal. Alternatively or in addition to heating, the metal surface can be exposed to an atmosphere having controlled pressure in order to tailor the treated surface.

In one aspect of the invention, a post treatment comprises exposing the substrate to a source of at least one carbonate or precursors thereof. Examples of carbonate comprise at least one member from the group of gaseous carbon dioxide, lithium carbonate, lithium bicarbonate, sodium carbonate, sodium bicarbonate, potassium carbonate, potassium bicarbonate, rubidium carbonate, rubidium bicarbonate, rubidium acid carbonate, cesium carbonate, ammonium carbonate, ammonium bicarbonate, ammonium carbamate and ammonium zirconyl carbonate. Normally, the carbonate source will be water soluble. In the case of a carbonate precursor such as carbon dioxide, the precursor can be passed through a liquid (including the silicate containing medium) and the substrate immersed in the liquid. One specific example of a suitable postreatment is disclosed in U.S. Pat. No. 2,462,763; hereby incorporated by reference. Another specific example of a post treatment comprises exposing a treated surface to a solution obtained by diluting ammonium zirconyl carbonate (1:4) in distilled water (e.g., Bacote® 20 supplied by Magnesium Elektron Corp). If desired, this post treated surface can be topcoated (e.g., aqueous or water borne topcoats).

In another aspect of the invention, the post treatment comprises exposing the substrate to a source comprising at least one acid source or precursors thereof. Examples of suitable acid sources comprise at least one member chosen from the group of phosphoric acid, hydrochloric acid, molybdic acid, silicic acid, acetic acid, citric acid, nitric acid, hydroxyl substituted carboxylic acid, glycolic acid, lactic acid, malic acid, tartaric acid, ammonium hydrogen citrate, ammonium bifluoride, fluoboric acid, fluorosilicic acid, among other acid sources effective at improving at least one property of the treated metal surface. The pH of the acid post treatment may be modified by employing at least one member selected from the group consisting of ammonium citrate dibasic (available commercially as Citrosol® #503 and Multiprep®), fluoride salts such as ammonium bifluoride, fluoboric acid, fluorosilicic acid, among others. The acid post treatment can serve to activate the surface thereby improving the effectiveness of rinses, sealers and/or topcoatings (e.g., surface activation prior to contacting with a sealer can improve cohesion between the surface and the sealer thereby improving the corrosion resistance of the treated substrate). Normally, the acid source will be water soluble and employed in amounts of up to about 15 wt. % and typically, about 1 to about 5 wt. % and have a pH of less than about 5.5.

In another aspect of the invention, the post treatment comprises contacting a surface treated by the inventive process with a rinse. By "rinse" it is meant that an article or a treated surface is sprayed, dipped, immersed or other wise exposed to the rinse in order to affect the properties of the treated surface. For example, a surface treated by the inventive process is immersed in a bath comprising at least one rinse. In some cases, the rinse can interact or react with at least a portion of the treated surface. Further the rinsed surfaced can be modified by multiple rinses, heating, topcoating, adding dyes, lubricants and waxes, among other processes. Examples of suitable compounds for use in rinses comprise at least one member selected from the group of titanates, titanium chloride, tin chloride, zirconates, zirconium acetate, zirconium oxychloride, fluorides such as calcium fluoride, tin fluoride, titanium fluoride, zirconium fluoride; coppurous compounds, ammonium fluorosilicate, metal treated silicas (e.g., Ludox®), combinations comprising colloidal silica, nitrates such as aluminum nitrate; sulphates such as magnesium sulphate, sodium sulphate, zinc sulphate, silanes, siloxyanes, siloxyenes, and copper sulphate; lithium compounds such as lithium acetate, lithium bicarbonate, lithium citrate, lithium metaborate, lithium vanadate, lithium tungstate, among others. The rinse can further comprise at least one organic compound such as vinyl acrylics, fluorosurfactancts, polyethylene wax, TEOS, zirconyl ammonium carbonate, among others. Examples of commercially available rinses, sealers and topcoats comprise at least one member selected from the group of Aqualac® (urethane containing aqueous solution), W86®, W87®, B37®, T01®, E10®, B17, B18 among others (a heat cured coating supplied by the Magni® Group), JS2030S (sodium silicate containing rinse supplied by MacDermid Incorporated), JS2040I (a molybdenum containing rinse also supplied by MacDermid Incorporated), EnSeal® C-23 (an acrylic based coating supplied by Enthone), EnSeal® C-26, Enthone® C-40 (a pigmented coating supplied Enthone), Microseal®, Paraclene® 99 (a chromate containing rinse), EcoTri® (a silicate/polymer rinse), MCI Plus OS (supplied by Metal Coatings International), silanes (e.g., Dow Corning Z-6040, Gelest SIA 0610.0, among others), ammonium zirconyl carbonate (e.g., Bacote 20), urethanes (e.g., Agate L18), among others. One specific rinse comprises water, water dispersible urethane, and at least one silicate, e.g., refer to commonly assigned U.S. Pat. No. 5,871,668; hereby incorporated by reference. While the rinse can be employed neat, normally the rinse will be dissolved, diluted or dispersed within another medium such as water, organic solvents, among others. While the amount of rinse employed depends upon the desired results, normally the rinse comprises about 0.1 wt % to about 50 wt. % of the rinse medium. The rinse can be employed as multiple applications and, if desired, heated. The rinse can be employed after a thermal treatment, e.g., after removing from the silicate medium the part is dried and then rinsed. Moreover, the aforementioned rinses can be modified by incorporating at least one dopant, e.g. the aforementioned dopants. The dopant can employed for interacting or reacting with the treated surface. If desired, the dopant can be dispersed in a suitable medium such as water and employed as a rinse.

The inventive process can create a flexible surface that can survive secondary processes, e.g., metal deformation for riveting, sweging, crimping, among other processes, and continue to provide corrosion protection. Such is in contrast to typical corrosion inhibitors such as chromates that tend to crack when the underlying surface is shaped. If desired, the surface formed by the inventive process can be topcoated (e.g, with a heat cured epoxy), prior to secondary processing. Articles treated in accordance with the inventive process, topcoated and exposed to a secondary process retain their desirable corrosion resistance, coating adhesion, component functionality, among properties.

The inventive process can provide a surface (e.g., mineral coating) that can enhance the surface characteristics of the metal or conductive surface such as resistance to corrosion, protect carbon (fibers for example) from oxidation, stress crack corrosion (e.g., stainless steel), hardness, thermal resistance, improve bonding strength in composite materials, provide dielectric layers, improve corrosion resistance of printed circuit/wiring boards and decorative metal finishes, and reduce the conductivity of conductive polymer surfaces including application in sandwich type materials.

The mineral coating can also affect the electrical and magnetic properties of the surface. That is, the mineral coating can impart electrical resistance or insulative properties to the treated surface. By having an electrically non-conductive surface, articles having the inventive layer can reduce, if not eliminate, electro-galvanic corrosion in fixtures wherein current flow is associated with corrosion, e.g., bridges, pipelines, among other articles.

Depending upon the intended usage of the workpiece treated by the inventive method, the workpiece can be coated with a secondary coating or layer. Alternatively, the treated workpiece can be rinsed (as described above) and then coated with a secondary coating or layer. Examples of such secondary coatings or layers comprise one or more members of acrylic coatings (e.g., IRILAC®), e-coats, silanes including those having amine, acrylic and aliphatic epoxy functional groups, latex, urethane, epoxies, silicones, alkyds, phenoxy resins (powdered and liquid forms), radiation curable coatings (e.g., UV curable coatings), lacquer, shellac, linseed oil, among others. Secondary coatings can be solvent or water borne systems. Secondary coatings can also include corrosion inhibitors, torque tension modifiers, among other additives (e.g., a coating comprising urethanes, acrylics, corrosion inhibitor and sodium silicate). The secondary coatings can be applied by using any suitable conventional method such as immersing, dip-spin, spraying, among other methods. The secondary coatings can be cured by any suitable method such as UV exposure, heating, allowed to dry under ambient conditions, among other methods. An example of UV curable coating is described in U.S. Pat. Nos. 6,174,932 and 6,057,382; hereby incorporated by reference. Normally, the surface formed by the inventive process will be rinsed, e.g., with at least one of deionized water, silane or a carbonate, or subjected to a thermal treatment (e.g., removal from the silicate bath, dried and then rinsed to remove residual material), prior to applying a topcoat. The secondary coatings can be employed for imparting a wide range of properties such as improved corrosion resistance to the underlying mineral layer, reduce torque tension, a temporary coating for shipping the treated workpiece, decorative finish, static dissipation, electronic shielding, hydrogen and/or atomic oxygen barrier, among other utilities. The mineral coated metal, with or without the secondary coating, can be used as a finished product or a component to fabricate another article.

The thickness of the rinse, sealer and/or topcoat can range from about 0.00001 inch to about 0.025 inch. The selected thickness varies depending upon the end use of the coated article. In the case of articles having close dimensional tolerances, e.g., threaded fasteners, normally the thickness is less than about 0.00005 inch.

Without wishing to be bound by any theory or explanation a silica containing layer can be formed. By silica it is meant a framework of interconnecting molecular silica such as $SiO_4$ tetrahedra (e.g., amorphous silica, cristabalite, triydmite, quartz, among other morphologies depending upon the degree of crystalinity), monomeric or polymeric species of silicon and oxide, monomeric or species of silicon and oxide embedding colloidal species, among others. The crystalinity of the silica can be modified and controlled depending upon the conditions under which the silica is deposited, e.g., temperature and pressure. The silica containing layer may comprise: 1) low porosity silica (e.g., about 60 angstroms to 0.5 microns in thickness), 2) collodial silica (e.g., about 50 angstroms to 0.5 microns in thickness), 3) a mixture comprising 1 and 2, 4) residual silicate such as sodium silicate and in some cases combined with 1 and 2; and 5) monomeric or polymeric species optionally embedding other colloidal silica species such as colloidal silica. The formation of a silica containing layer can be enhanced by the addition of colloidal particles to the silicate medium. An example of suitable colloidal particles comprise colloidal silica having a size of at least about 12 nanometers to about 0.1 micron (e.g., Ludox® HS 40, AM 30, and CL). The colloidal silica can be stabilized by the presence of metals such as sodium, aluminum/alumina, among others.

If desired, the silica containing film or layer can be provided in as a secondary process. That is, a first film or layer comprising a disilicate can be formed upon the metallic surface and then a silica containing film or layer is formed upon the disilicate surface. An example of this process is described in U.S. Patent Application Serial No. 60/354,565, filed on Feb. 5, 2002 and entitled "Method for Treating Metallic Surfaces"; the disclosure of which is hereby incorporated by reference.

The silica containing layer can be chemically or physically modified and employed as an intermediate or tie-layer. The tie-layer can be used to enhance bonding to paints, coatings, metals, glass, among other materials contacting the tie-layer. This can be accomplished by binding to the top silica containing layer one or more materials which contain alkyl, fluorine, vinyl, epoxy including two-part epoxy and powder paint systems, silane, hydroxy, amino, mixtures thereof, among other functionalities reactive to silica or silicon hydroxide. Alternatively, the silica containing layer can be removed by using conventional cleaning methods, e.g, rinsing with de-ionized water, or one of the aforementioned post-treatments, e.g. acid rinsing. If desired, the silica containing layer can be chemically and/or physically modified by employing the previously described post-treatments, e.g., exposure to at least one carbonate or acid source. The post-treated surface can then be contacted with at least one of the aforementioned secondary coatings, e.g, a heat cured epoxy.

In another aspect, the mineral without or without the aforementioned silica may layer functions as an intermediate or tie-layer for one or more secondary coatings, e.g., silane containing secondary coatings. Examples of such secondary coatings and methods that can be complimentary to the instant invention are described in U.S. Pat. Nos. 5,759,629; 5,750,197; 5,539,031; 5,498,481; 5,478,655; 5,455,080; and 5,433,976. The disclosure of each of these U.S. Patents is hereby incorporated by reference. For example, improved corrosion resistance of a metal substrate can be achieved by using a secondary coating comprising at least one suitable silane in combination with a mineralized surface. Examples of suitable silanes comprise at least one members selected from the group consisting of tetraethylorthosilicate (TEOS) and TMOS with styrene, and etc., bis-1,2-(triethoxysilyl) ethane (BSTE), vinyl silane or aminopropyl silane, epoxy silanes, alkoxysilanes, methacryloxypropyl trimethoxysilanes, glycidoxypropyl trimethoxysilane, vinyltriactoxysilane, among other organo functional silanes. The silane can bond with the mineralized surface and then the silane can cure thereby providing a protective top coat, or a surface for receiving an outer coating or layer. In some cases, it is desirable to sequentially apply the silanes. For example, a steel substrate, e.g., a fastener, can be treated by the inventive process to form a mineral layer, allowed to dry, rinsed in deionized water, coated with a 5% BSTE solution, coated again with a 5% vinyl silane solution, and powder coated with a thermoset epoxy paint (Corvel 10-1002 by Morton) at a thickness of 2 mils.

The inventive process forms a surface that has improved adhesion to outer coatings or layers, e.g., secondary coatings. Examples of suitable outer coatings comprise at least one member selected from the group consisting of acrylics, epoxies, e-coats, latex, urethanes, silanes (e.g., TEOS, TMEOS, among others), fluoropolymers, alkyds, silicones, polyesters, oils, gels, grease, among others. An example of a suitable epoxy comprises a coating supplied by The Magni® Group as B17 or B18 top coats, e.g, a galvanized article that has been treated in accordance with the inventive method and contacted with at least one silane and/or ammonium zirconium carbonate and top coated with a heat cured epoxy (Magni® B18) thereby providing a chromate free corrosion resistant article. By selecting appropriate rinses, secondary and outer coatings for application upon the mineral, a corrosion resistant article can be obtained without chromating or phosphating. Such a selection can also reduce usage of zinc to galvanize iron containing surfaces, e.g., a steel surface is mineralized, coated with a silane containing coating and with an outer coating comprising an epoxy.

Without wishing to be bound by any theory or explanation, it is believed that the inventive process forms a surface that can release or provide water or related moieties. These moieties can participate in a hydrolysis or condensation reaction that can occur when an overlying rinse, seal or topcoating cures. Such participation improves the cohesive bond strength between the surface and overlying cured coating.

The surface formed by the inventive process can also be employed as an intermediate or tie-layer for glass coatings, glass to metal seals, hermetic sealing, among other applications wherein it is desirable to have a joint or bond between a metallic substrate and a glass layer or article. The inventive surface can serve to receive molten glass (e.g., borosilicate, aluminosilicate, phosphate, among other glasses), while protecting the underlying metallic substrate and forming a seal.

The surface formed by the inventive process can also be employed as a heat resistant surface. The surface can be employed to protect an underlying surface from exposure to molten metal (e.g., molten aluminum).

The inventive process can provide a surface that improves adhesion between a treated substrate and an adhesive. Examples of adhesives comprise at least one member selected from the group consisting of hot melts such as at least one member selected from the group of polyamides, polyimides, butyls, acrylic modified compounds, maleic anhydride modified ethyl vinyl acetates, maleic anhydride modified polyethylenes, hydroxyl terminated ethyl vinyl acetates, carboxyl terminated ethyl vinyl acetates, acid terpolymer ethyl vinyl acetates, ethylene acrylates, single phase systems such as dicyanimide cure epoxies, polyamide cure systems, lewis acid cure systems, polysulfides, moisture cure urethanes, two phase systems such as epoxies, activated acrylates polysulfides, polyurethanes, among others. Two metal substrates having surfaces treated in accordance with the inventive process can be joined together by using an adhesive. Alternatively one substrate having the inventive surface can be adhered to another material, e.g., joining treated metals to plastics, ceramics, glass, among other surfaces. In one specific aspect, the substrate comprises an automotive hem joint wherein the adhesive is located within the hem.

The improved cohesive and adhesive characteristics between a surface formed by the inventive process and polymeric materials can permit forming acoustical and mechanical dampeners, e.g., constraint layer dampers such as described in U.S. Pat. No. 5,678,826 hereby incorporated by reference, motor mounts, bridge/building bearings, HVAC silencers, highway/airport sound barriers, among other articles. The ability to improve the bond between vistoelastomeric materials sandwiched between metal panels in dampers reduces sound transmission, improves formability of such panels, reduces process variability, among other improvements. The metal panels can comprise any suitable metal such as 304 steel, stainless steel, aluminum, cold rolled steel, zinc alloys, hot dipped zinc or electrogalvanized, among other materials. Examples of polymers that can be bonded to the inventive surface and in turn to an underlying metal substrate comprise any suitable material such as neoprene, EPDM, SBR, EPDM, among others. The inventive surface can also provide elastomer to metal bonds described in U.S. Pat. No. 5,942,333; hereby incorporated by reference.

The inventive process can employ dopants, rinses, sealers and/or topcoats for providing a surface having improved thermal and wear resistance. Such surfaces can be employed in gears (e.g., transmission), powdered metal articles, exhaust systems including manifolds, metal flooring/grates, heating elements, among other applications wherein it is desirable to improve the resistance of metallic surfaces.

In another aspect of the invention, the inventive process can be used to produce a surface that reduces, if not eliminates, molten metal adhesion (e.g., by reducing intermetallic formation). Without wishing to be bound by any theory or explanation, it is believed that the inventive process provides an ablative and/or a reactive film or coating upon an article or a member that can interact or react with molten metal thereby reducing adhesion to the bulk article. For example, the inventive process can provide an iron or a zinc silicate film or layer upon a substrate in order to shield or isolate the substrate from molten fluid contact (e.g., molten glass, aluminum, zinc or magnesium). The effectiveness of the film or layer can be improved by applying an additional coating comprising silica (e.g., to function as an ablative when exposed to molten metal or glass). The ability to prevent molten metal adhesion is desirable when die casting aluminum or magnesium over zinc cores, die casting aluminum for electronic components, among other uses. The molten metal adhesion can be reduced further by applying one of the aforementioned topcoatings, e.g. Magni® B18, acrylics, polyesters, among others. The topcoatings can be modified (e.g., to be more heat resistant, or reactive to alumina or aluminum) by adding a heat resistant material such as colloidal silica (e.g., Ludox®).

While the above description places particular emphasis upon forming a mineral containing layer upon a metal surface, the inventive process can be combined with or replace conventional metal pre or post treatment and/or finishing practices. Conventional post coating baking methods can be employed for modifying the physical characteristics of the mineral layer, remove water and/or hydrogen, among other modifications. The inventive mineral layer can be employed to protect a metal finish from corrosion thereby replacing conventional phosphating process, e.g., in the case of automotive metal finishing the inventive process could be utilized instead of phosphates and chromates and prior to coating application e.g., E-Coat. The inventive process can be employed for imparting enhanced corrosion resistance to electronic components. The inventive process can also be employed in a virtually unlimited array of end-uses such as in conventional plating operations as well as being adaptable to field service. For example, the inventive mineral containing coating can be employed to fabricate corrosion resistant metal products that conventionally utilize zinc as a protective coating, e.g., automotive bodies and components, grain silos, bridges, among many other end-uses. Moreover, depending upon the dopants and concentration thereof present in the mineral deposition solution, the inventive process can produce microelectronic films, e.g., on metal or conductive surfaces in order to impart enhanced electrical/magnetic (e.g., EMI shielding, reduced electrical connector fretting, reduce corrosion caused by dissimilar metal contact, among others), and corrosion resistance, or to resist ultraviolet light and monotomic oxygen containing environments such as outer space.

The following Examples are provided to illustrate certain aspects of the invention and it is understood that such an Example does not limit the scope of the invention.

EXAMPLE 1

The effect on the deposit characteristics of the following parameters were studied: (i) pH of bath, (ii) temperature of deposition, and (iii) rinsing immediately or after one day. Subsequent to deposition, impedance analysis and linear polarization were used to electrochemically characterize the final deposit.

The base silicate medium solution comprised 800 mL of distilled water+100 mL of PQ N Sodium Silicate solution (hereinafter referred to as 1:8 sodium:silicon solution). The PQ N Sodium Silicate solution is 8.9 wt % $Na_2O$ and 28.7 wt % $SiO_2$. The deposition was carried out in a plating cell made of glass on ACT zinc plated steel panels. Prior to deposition the panels were degreased with acetone and washed with demineralized water. Two different sets of parameters were varied in this experiment:

First, the effect of pH was studied at 75° C. at 10.5, 10.8, 11, 11.5 and 12.

Next, the effect of temperature was studied at 75° C., 80° C. and 85° C.

For both studies, the immersion time was held constant at 15 minutes. Subsequent to mineralization one set of panels was rinsed immediately. The second set of samples were rinsed after 24 hours before carrying out the measurements.

Next, the corrosion characteristics of the panel were studied in 0.5 M $Na_2SO_4$ solution at pH 4. A representative panel area of 1 $cm^2$ was chosen for testing. A three-electrode setup was used to study the corrosion behavior of the mineralized samples. The electrolyte used in this study is 0.5 M sodium sulfate, pH=4. Ti coated with Pd was used as the counter electrode. $Hg/Hg_2SO_4$ was used as the reference electrode. All potentials in this study are referred with respect to the $Hg/Hg_2SO_4$ electrode. Corrosion studies were done using Scribner Associates Corrware Software with EG&G Princeton applied Model 273 potentiostat/galvanostat and a Solartron 1255 frequency analyzer in accordance with conventional methods. The electrode was left on open circuit till the potential is stabilized. After the potential stabilized, non-destructive evaluation of the surface was done using linear polarization and impedance analysis. During linear polarization, the potential was varied 10 mV above and below the open circuit potential of the mineralized sample at a scan rate of 0.1667 mV/s. The impedance data generally covered a frequency range of 5 mHz to 10 kHz. A sinusoidal ac voltage signal varying by ±10 mV was applied. The electrode was stable during the experiments and its open circuit potential changed less than 1 mV.

In moderately alkaline solutions (pH<10.5) zinc forms passive films which reduce the rate of metal dissolution. Increasing the pH above 10.5 has a tendency to dissolve the passive film and active metal corrosion. FIG. 1 presents the open-circuit potential of galvanized zinc panels immersed in the base solution of pH 10.5. As seen from the plot, the potential initially increases from an initial value of around −0.49 V to more positive values. This indicates the formation of a passive film on the surface of zinc in presence of the base solution.

Figure 2:
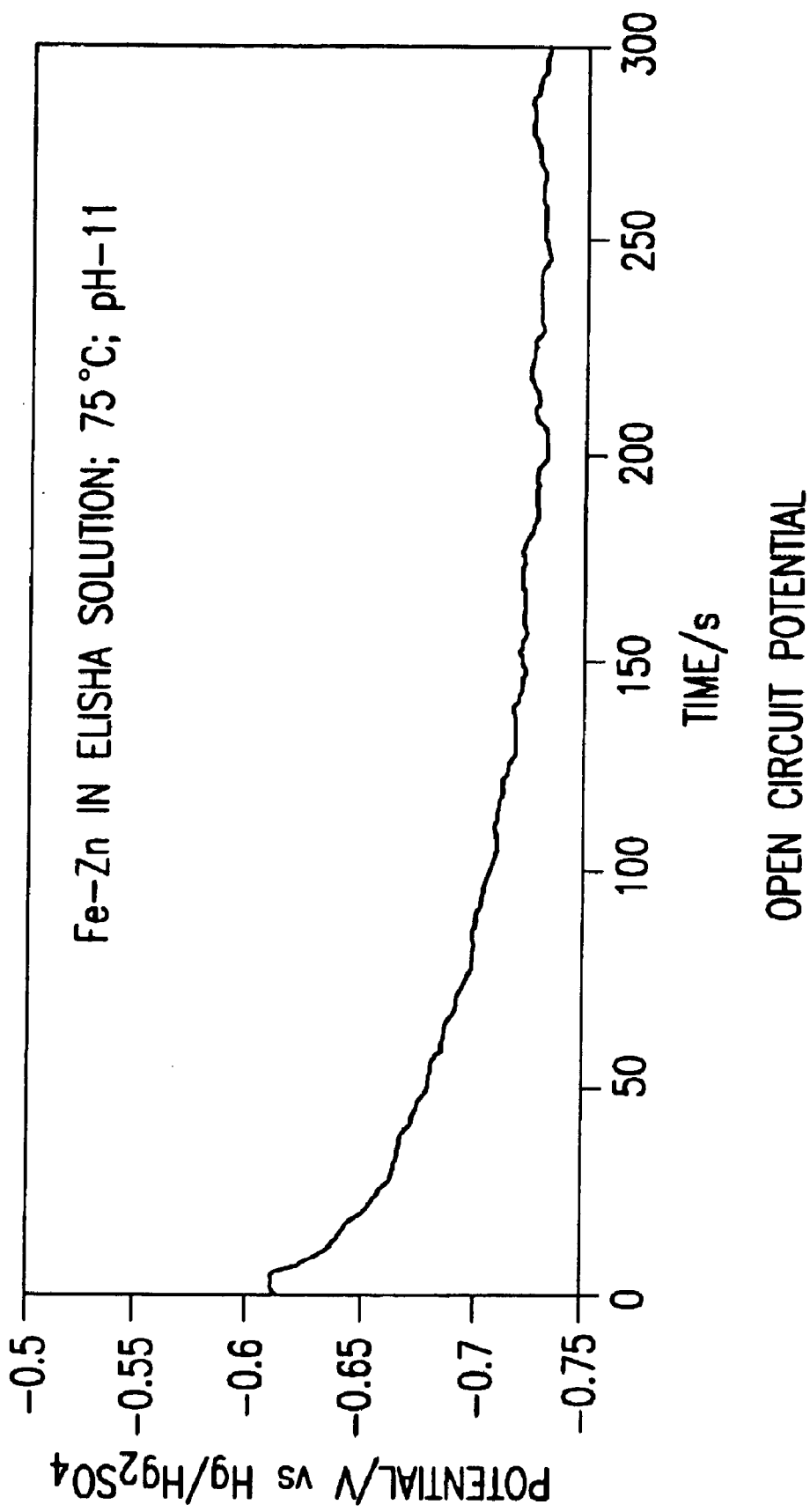
FIG. 2 illustrates the open-circuit potential of galvanized steel panels immersed in the inventive medium having a pH 11.

FIG. 2 shows the potential of galvanized steel in the base solution, pH=11 as a function of time. As shown in FIG. 2, the potential is more negative than that seen in FIG. 1 indicating formation of a relatively less stable film than the film formed at pH=10.5. However the observed potential of −0.7 V vs Hg/HgO reference electrode still indicates a passive film formation on Zn surface in presence of silicate solution even at pH=11.

Figure 3:
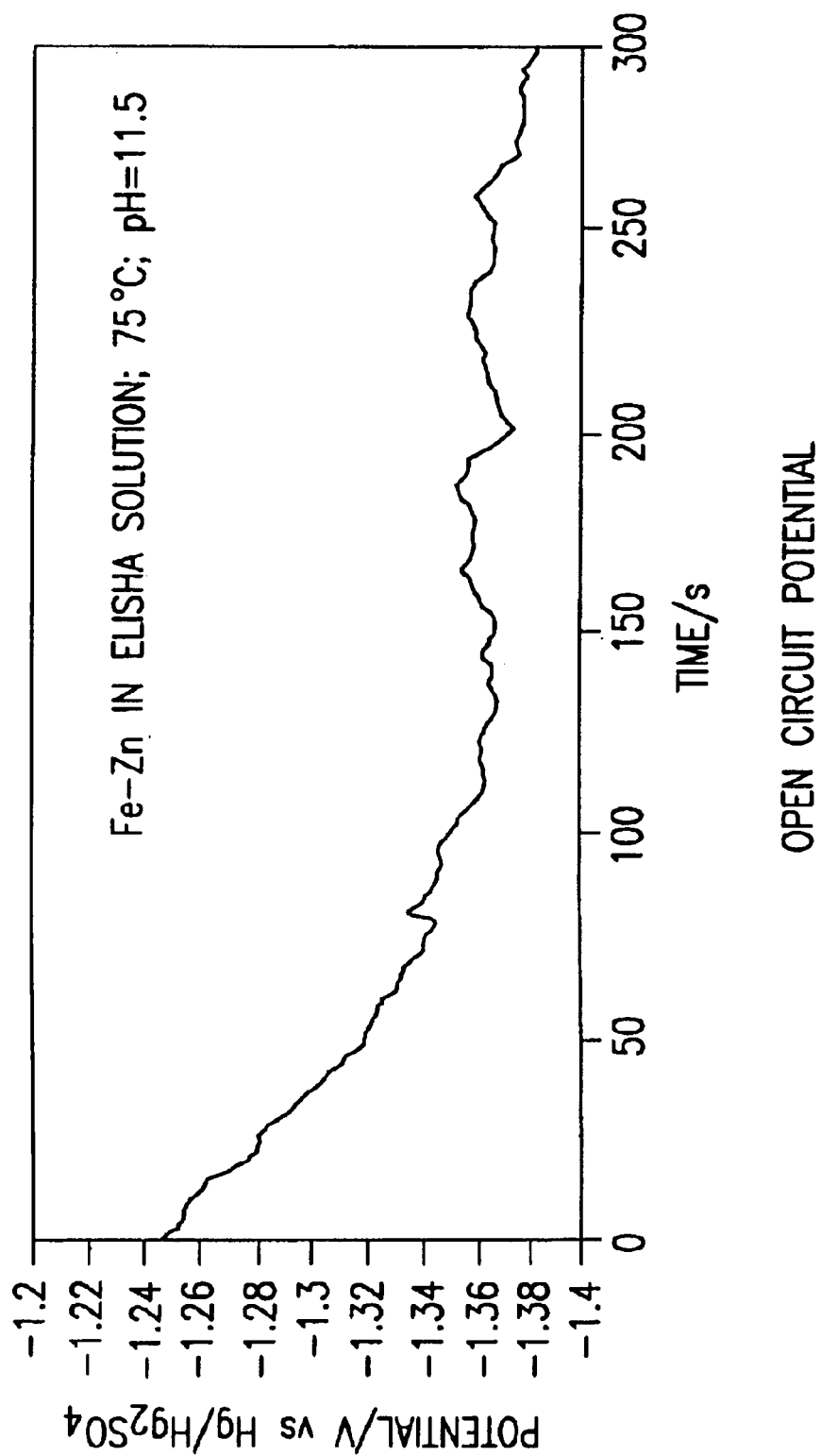
FIG. 3 illustrates the open-circuit potential of galvanized steel panels immersed in the inventive medium having a pH of 11.5.

Increasing the pH further to 11.5, can reduce the effectiveness of the inventive process (see FIG. 3). Note that the corrosion potential increases up to −1.38 V vs $Hg/HgSO_4$ reference electrode which is dissolution potential for Zn.

According to Pourbaix (Pourbaix, M.: Atlas of Electrochemical Equilibria in Aqueous Solutions, 2nd ed., National Association of Corrosion Engineers, Houston, pp. 406–413, 1974; hereby incorporated by reference), zinc exists in the various forms in solution, some of which are given below. The various equilibrium reactions between the dissolved substances are as follows:

$$Zn^{2+} + H_2O = ZnOH^+ + H^+; \log\frac{(ZnOH^+)}{(Zn^{2+})} = -9.67 + pH \quad (1)$$

$$ZnOH^+ + H_2O = HZnO_2^- + 2H^+; \log\frac{(HZnO_2^-)}{(ZnOH^+)} = -17.97 + 2pH \quad (2)$$

$$Zn^{2+} + 2H_2O = HZnO_2^- + 3H^+; \log\frac{(HZnO_2^-)}{(Zn^{2+})} = -27.63 + 3pH \quad (3)$$

$$HZnO_2^- = ZnO_2^{2-} + H^+; \log\frac{(ZnO_2^{2-})}{(HZnO_2^-)} = -13.11 + pH \quad (4)$$

With the increase in pH, the equilibrium is shifted to the right in all the above reactions. For reaction (2) and (3) the effect is more because of the greater dependence on $H^+$ concentration. Between pH 8.98 and 13.11 $HZnO_2^-$ dominates. Beyond this $ZnO_2^-$ is present.

This Example illustrate that increasing beyond a certain level the pH decreases the chances for the formation of a passive film.

Figure 4:
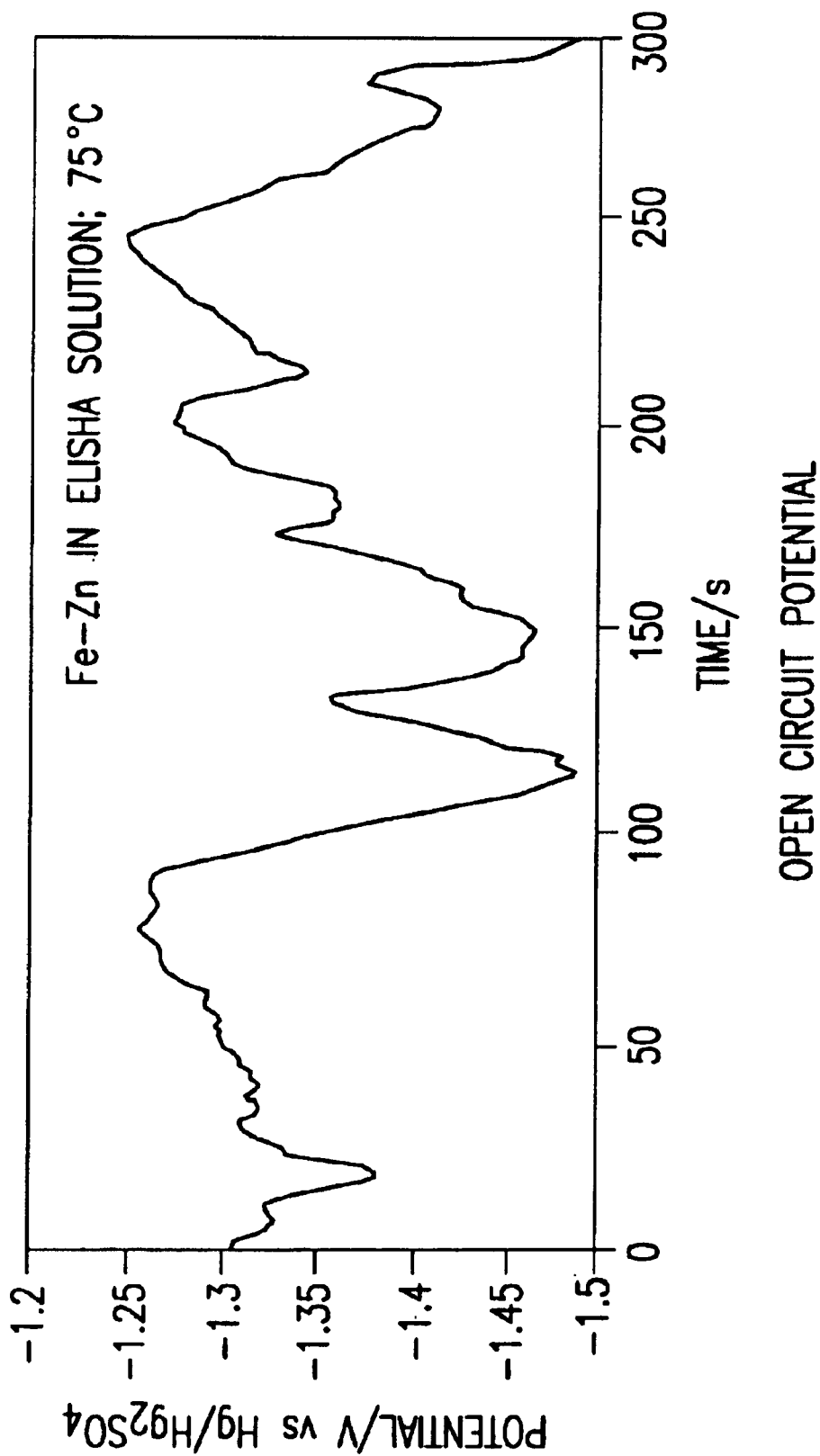
FIG. 4 illustrates the open-circuit potential of galvanized steel panels immersed in the inventive medium having a pH 12.

At pH 12 (FIG. 4) corrosion increases and the metal potential fluctuates significantly. Increasing the pH of the silicate medium beyond about 11 can cause active dissolution of the zinc leading to decreasing the protective zinc layer thickness. Increasing the temperature is seen to accelerate the rate of metal dissolution. Similar behavior is observed for pure Zn samples.

Figure 5:
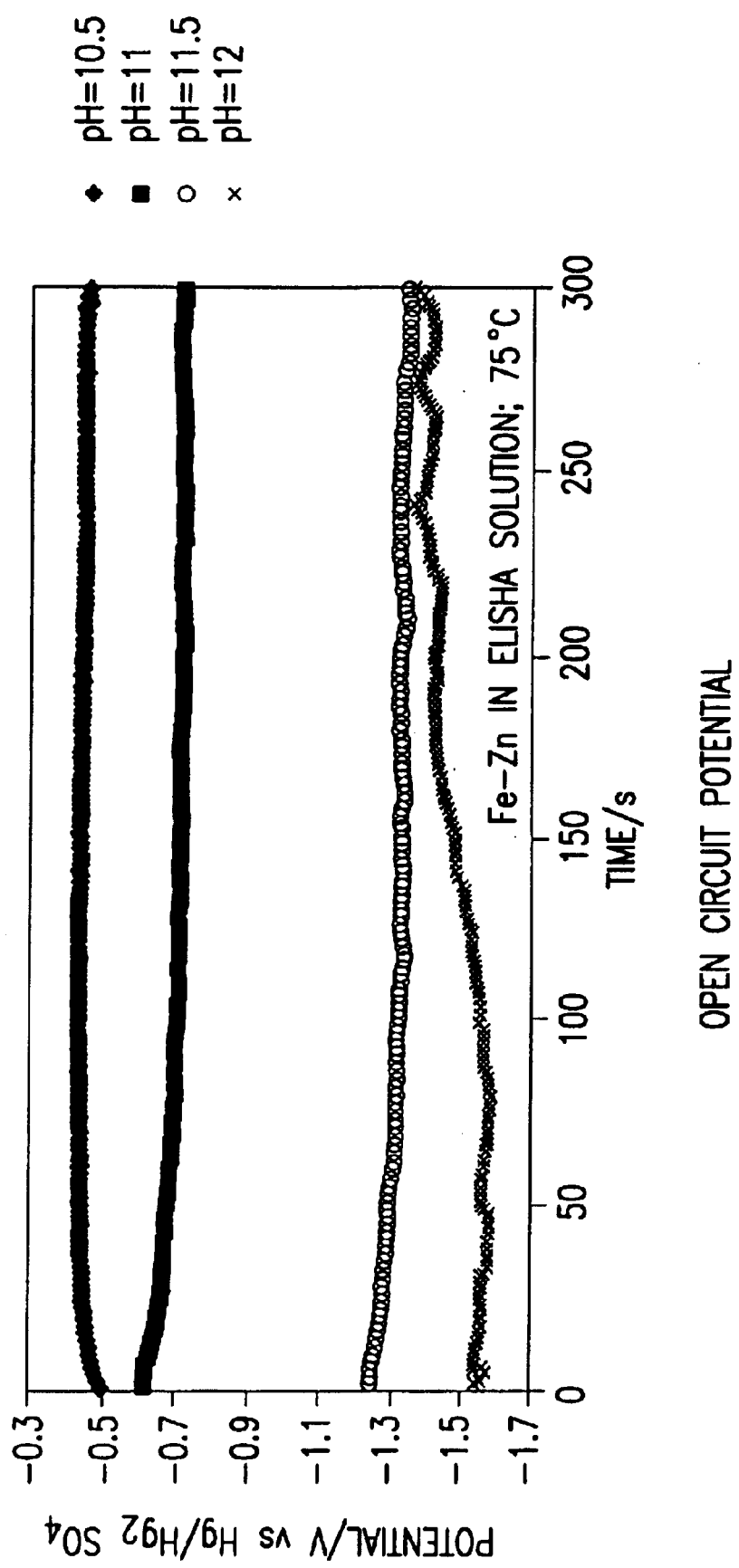
FIG. 5 illustrates the corrosion potentials of galvanized steel panels immersed in the inventive medium having a temperature of 75 C. and pHs of 10.5, 11, 11.5 and 12.
Figure 6:
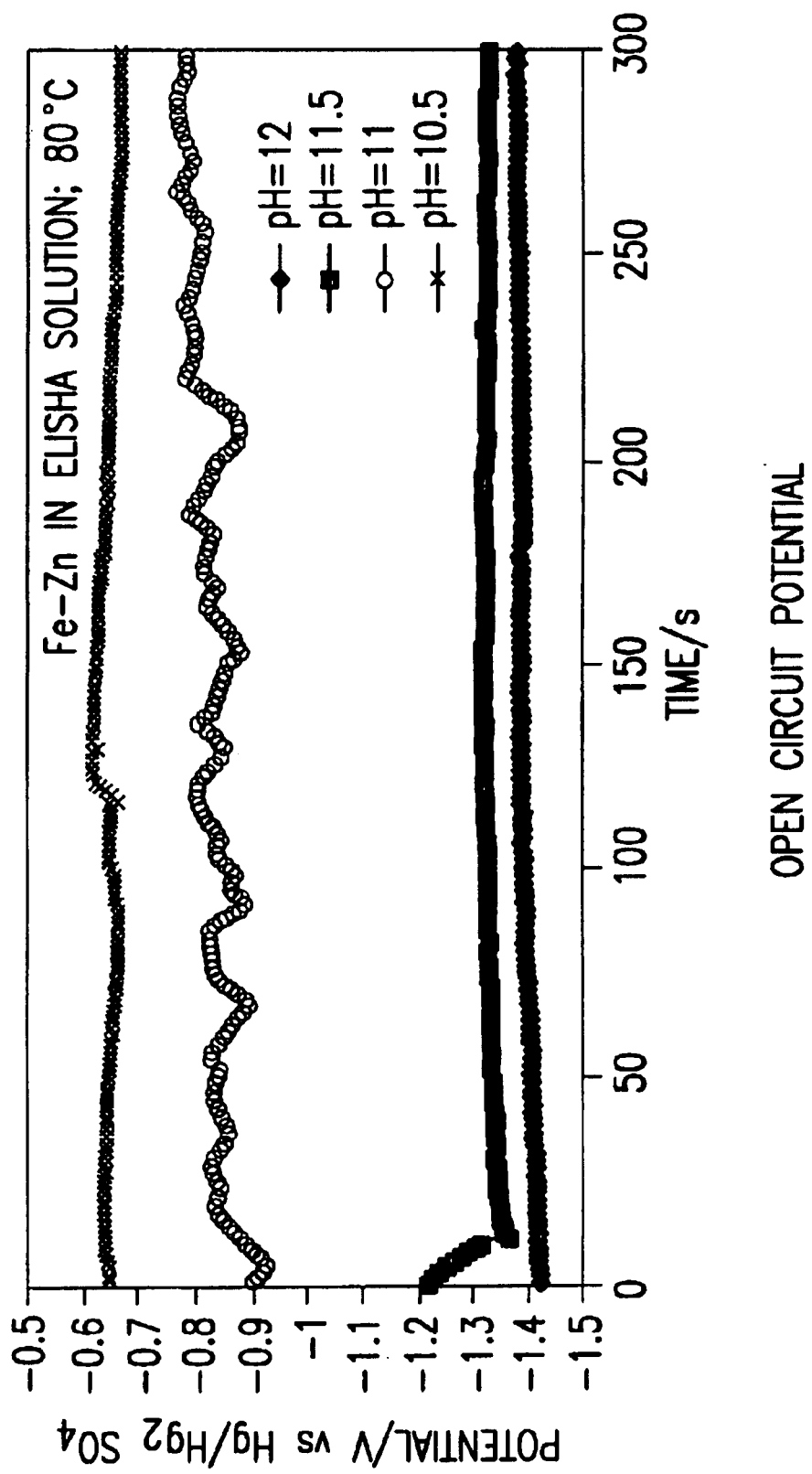
FIG. 6 illustrates the corrosion potentials of galvanized steel panesl immersed in the inventive medium having a temperature of 80 C. and pHs of 10.5, 11, 11.5 and 12.

FIG. 5 and FIG. 6 summarizes the corrosion potentials determined on galvanized steel samples in base solution at 75° and 80° C., respectively. The corrosion potentials are shown as a function of time estimated in solutions with pH 10.5, 11, 11.5 and 12. The results indicated that at pH 10.5 at 75° C. and 80° C. passive film forms which is stable as a function of time. Note that increasing the temperature from 75 to 80° C., the potentials estimated at pH=10.5 and 11 shifts for approximately 200 mV in cathodic direction indicating a higher probability for a decrease of the coating barrier properties.

Figure 7:
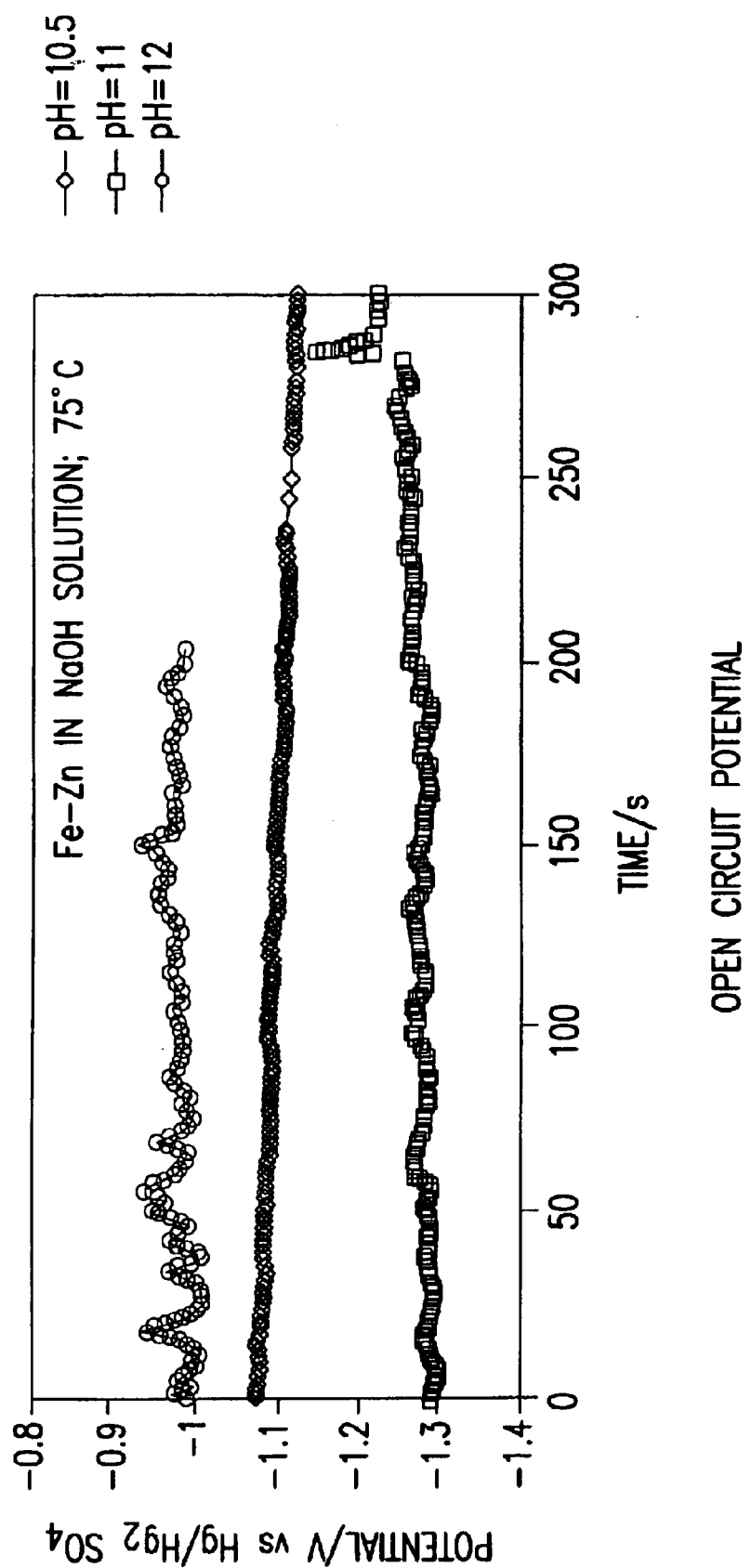
FIG. 7 illustrates the open circuit potential for galvanized steel panels exposed to pHs of 10.5, 11 and 12.

FIG. 7 shows the open circuit potential studies for Zn plated steel at different pHs (10.5, 11 and 12) in the absence of base solutions. As expected the relatively high corrosion potentials (higher than −1.0 V v. $Hg/HgSO_4$ reference electrode) were observed in the absence of silica in the solution indicating a high probability for Zn dissolution at pH 10.5 and higher Tables 1 and 2 summarize the polarization resistance data of samples treated in accordance with the inventive mineralization process and tested at different temperatures and pH's (10.5, 10.8, 11, 11.5 and 12). Subsequent to mineralization one set of panels was rinsed immediately. The second set of samples was rinsed after 24 hours before carrying out the measurements. The rinsed panels data are presented in Table 1, while the data obtained from panels rinsed after 24 hours are presented in Table 2. In general the samples rinsed after 24 hours showed higher resistances. Increase in temperature from 75° C. to 80° C. leads to an increase in resistance. In contrast increasing the pH from 10.5 to 12 leads to a decrease in average resistance.

TABLE 1

No Current Data for temperatures 75, 80, and 85° C. - Rinse 0.5 M $Na_2SO_4$

| pH | 10.5 | 10.8 | 11 | 11.5 | 12 |
|---|---|---|---|---|---|
| 75° C. | | | | | |
| Rp (Ω) | 586 | 2060 | 712 | 584 | 410 |
| Rp (Ω) | 697 | 1318 | 896 | 595 | 422 |
| Rp (Ω) | 948 | 1429 | 686 | 183 | 404 |
| Rp (Ω) | 840 | 1231 | 609 | 801 | 473 |
| Rp (Ω) | 858 | | 799 | 916 | 609 |
| Rp (Ω) | 996 | | 826 | 1441 | 931 |
| Average | 821 | 1510 | 755 | 753 | 542 |
| 80° C. | | | | | |
| Rp (Ω) | 1072 | 1227 | 1219 | 849 | 731 |
| Rp (Ω) | 963 | 892 | 1252 | 719 | 710 |
| Rp (Ω) | 540 | 1346 | 1526 | 830 | 778 |
| Rp (Ω) | 1319 | 2010 | 1301 | 624 | 905 |
| Rp (Ω) | 2203 | | 1079 | 975 | 1050 |
| Rp (Ω) | 3342 | | 1951 | 998 | 898 |
| Average | 1573 | 1369 | 1388 | 833 | 845 |
| 85° C. | | | | | |
| Rp (Ω) | 249 | 1115 | 1887 | 783 | |
| Rp (Ω) | 519 | 1323 | 2080 | 1268 | |
| Rp (Ω) | 1078 | 1124 | 2133 | 1486 | |
| Rp (Ω) | 1429 | 926 | 1603 | 1225 | |
| Rp (Ω) | | 1855 | | | |
| Rp (Ω) | | 757 | | | |
| Rp (Ω) | | 586 | | | |
| Rp (Ω) | | 817 | | | |
| Average | 819 | 1063 | 1926 | 1191 | |

TABLE 2

No Current Data for temperatures 75, 80, and 85° C. - RINSED AFTER 24 HOURS 0.5 M $Na_2SO_4$

| pH | 10.5 | 10.8 | 11 | 11.5 | 12 |
|---|---|---|---|---|---|
| 75° C. | | | | | |
| Rp (Ω) | 1136 | 1757 | 1000 | 712 | 766 |
| Rp (Ω) | 846 | 1229 | 1295 | 727 | 592 |
| Rp (Ω) | 1223 | 1649 | 1327 | 641 | 950 |
| Rp (Ω) | 921 | 1423 | 983 | 1133 | 1044 |
| Rp (Ω) | 1458 | | 4092 | 1624 | 1483 |
| Rp (Ω) | 3465 | | 2509 | 2159 | 2106 |
| Average | 1508 | 1515 | 1868 | 1166 | 1157 |
| 80° C. | | | | | |
| Rp (Ω) | 793 | 983 | 1715 | 2564 | 804 |
| Rp (Ω) | 1490 | 989 | 1320 | 2809 | 931 |
| Rp (Ω) | 1418 | 1094 | 1874 | 2792 | 563 |
| Rp (Ω) | 1541 | 1085 | 1476 | 1973 | 509 |
| Rp (Ω) | 3565 | | 2236 | 7370 | 982 |
| Rp (Ω) | 1545 | | 12413 | 1265 | 4904 |
| Average | 1725 | 1038 | 3506 | 3129 | 1449 |
| 85° C. | | | | | |
| Rp (Ω) | 785 | 729 | 941 | 1154 | |
| Rp (Ω) | 810 | 1050 | 883 | 1169 | |
| Rp (Ω) | 638 | 1457 | 992 | 1041 | |
| Rp (Ω) | 648 | 1577 | 7996 | 3769 | |
| Rp (Ω) | | 1197 | | | |
| Rp (Ω) | | 519 | | | |
| Rp (Ω) | | 739 | | | |
| Rp (Ω) | | 957 | | | |
| Average | 720 | 1028 | 2703 | 1783 | |

EXAMPLE 2

A 1:8 (alkali to silica ratio) sodium silicate solution was prepared as described in Example 1. The effect of deposition time, the pH of the silicate medium and the temperature of the silicate medium were studied. Prior to deposition the panels were degreased with acetone and washed with demineralized water. The experiments were performed in duplicate. One set of panels was rinsed immediately following deposition and a second set was rinsed 24 hours later. The corrosion characteristics of the panels were tested in 0.5 M $Na_2SO_4$ solution at pH 4. A representative panel area of 1 $cm^2$ was tested. The rest of the panel was masked with an insulating tape. A three-electrode setup was used to study the corrosion behavior of the mineralized samples. Titanium coated with palladium was used as the counter electrode and Hg/Hg$_2$Cl$_2$ was used as the reference electrode. All potentials are with respect to the Saturated Calomel electrode. Corrosion studies were done using a Scribner Associates Corrware Software with EG&G Princeton Applied Research Model 273 potentiostat/galvanostat and a Solartron 1255 frequency analyzer in accordance with conventional procedures. The electrode was left on open circuit until the potential stabilized. Non-destructive evaluation of the surface was done using linear polarization and impedance analysis. During linear polarization, the potential was varied 10 mV above and below the open circuit potential of the mineralized sample at a scan rate of 0.1667 mV/s. The impedance data generally covered a frequency range of 5 mHz to 10 kHz. A sinusoidal AC voltage signal varying by +/−10 mV was applied. The electrode was stable during the experiments and its open circuit potential changed less than 1 mV. Separately, samples were prepared for scanning electron microscopy (SEM) and EDAX analysis that were obtained by using a Hitachi S-2500 Delta SEM.

Table 3 presents corrosion resistance data for electroless plated prepared at different bath temperatures. In general, increasing the temperature from 25° C. to 75° C. leads to an increase in resistance. However, increasing the temperature further to 85° C. results in decrease in resistance. For these samples, 75° C. is a desirable bath temperature for electroless mineralization.

TABLE 3

Comparison of corrosion resistance for samples mineralized at different bath temperatures. Resistance ($\Omega$-cm$^2$) in pH 4, 0.5 M Na$_2$SO$_4$

| | Temperature | | | | | |
| --- | --- | --- | --- | --- | --- | --- |
| | 25° C. | | 75° C. | | 85° C. | |
| Location | Immediate Rinse | 24 Hour Rinse | Immediate Rinse | 24 Hour Rinse | Immediate Rinse | 24 Hour Rinse |
| 1 | 301 | 216 | 586 | 1136 | 249 | 718 |
| 2 | 225 | 321 | 697 | 846 | 519 | 835 |
| 3 | 265 | 345 | 948 | 1223 | 1078 | 638 |
| 4 | 400 | 425 | 840 | 921 | 1429 | 648 |
| 5 | 350 | 500 | 858 | 1458 | 819 | 720 |
| 6 | 215 | 322 | 996 | 3465 | 534 | 810 |
| Avg. | 292.7 | 354.8 | 821 | 1508 | 771.3 | 728.2 |
| High | 400 | 500 | 996 | 3465 | 1429 | 835 |
| Low | 215 | 216 | 586 | 846 | 519 | 638 |

Table 4 presents corrosion resistance data for electroless plated samples prepared at pH 10.5 and 11. Increasing the pH from 10.5 to 11 leads to an increase in average resistance. Samples that are rinsed after 24 hours typically exhibit better corrosion resistance than samples rinsed immediately. The same trend is observed for the samples prepared at different temperatures. FIG. 8 shows a comparison of the SEM and EDAX analysis of samples rinsed immediately and rinsed after 24 hours. Samples rinsed immediately have no detectable Si on the surface whereas samples rinsed after 24 hours show 12% Si on the surface. This corresponds to the increased resistance shown in Tables 3and 4.

TABLE 4

Comparison of corrosion resistance for samples mineralized at different pH in 1:8 sodium silicate at 75° C. Resistance ($\Omega$-cm$^2$) in pH 4, 0.5 M Na$_2$SO$_4$

| | pH | | | |
| --- | --- | --- | --- | --- |
| | 10.5 | | 11 | |
| Location | Immediate Rinse | 24 Hour Rinse | Immediate Rinse | 24 Hour Rinse |
| 1 | 586 | 1136 | 712 | 1000 |
| 2 | 697 | 846 | 896 | 1295 |
| 3 | 948 | 1223 | 686 | 1327 |
| 4 | 840 | 921 | 609 | 983 |
| 5 | 858 | 1458 | 799 | 4092 |
| 6 | 996 | 3465 | 826 | 2509 |
| Avg. | 821 | 1508 | 755 | 1868 |
| High | 996 | 3465 | 896 | 4092 |
| Low | 586 | 846 | 609 | 983 |

Table 5 presents compares the corrosion resistance of samples with different deposition times. In general, the resistance ranges from 1400–1700 W-cm2.

TABLE 5

Corrosion resistance for samples mineralized in 1:8 sodium silicate at 75° C. at different deposition times. Resistance ($\Omega$-cm$^2$) in pH 4, 0.5 M Na$_2$SO$_4$

| Location | 5 minutes | 10 minutes | 15 minutes | 20 minutes |
| --- | --- | --- | --- | --- |
| 1 | 2500 | 1885 | 2412 | 759 |
| 2 | 754 | 684 | 867 | 2295 |
| 3 | 913 | 2286 | 1686 | 1959 |
| Avg. | 1389 | 1618.3 | 1655 | 1668 |
| High | 2500 | 2286 | 2412 | 2295 |
| Low | 754 | 684 | 867 | 759 |

In view of the above data presented in Example 1 and 2, one of skilled in the art should understand and appreciate that the mineralization bath should be heated, typically to a temperature of about 70 to 80 C. One should also note that in general, rinsing the samples 24 hours after mineralization results in increased resistance measurements and higher silicon content than samples immediately rinsed after treatment. Finally it should be noted by a skilled artisan, that the corrosion resistance of the sample verse time is optimized after approximately 15 minutes of treatment in the mineralization bath. The temperature of the bath, silicate concentration and drying regime can be employed for optimizing the corrosion resistance of the treated metal surface.

EXAMPLE 3

As shown above, samples that are rinsed after 24 hours can show increased resistance compared to samples that are rinsed immediately, suggesting that the silicate dries and crystallizes on the surface. The present example demonstrates (i) the effect of post-mineralization heating and (ii) the effect of the concentration of the silicate bath.

A first set of samples were mineralized in a 1:8 (alkali:silica ratio) silicate solution for 15 minutes and dried at 100° C. for one hour immediately. A second set was mineralized and left to dry at room temperature for 24 hours. Table 6 shows corrosion resistance for the samples. Heating results in a dramatic increase in corrosion resistance, but the resistance may not be uniform across the samples, indicating non-uniformity of Si on the surface.

TABLE 6

Comparison of resistance for samples mineralized in 1:8 sodium silicate with and without post-deposition heating. Resistance ($\Omega$-cm$^2$) in pH 4, 0.5 M Na$_2$SO$_4$

| Location | No Heating | Heating at 100° C. for 1 hour |
|---|---|---|
| 1 | 2412 | $4.4 \times 10^4$ |
| 2 | 867 | $4.7 \times 10^4$ |
| 3 | 1686 | 725.2 |
| Avg. | 1655 | $3.1 \times 10^4$ |
| High | 2412 | $4.7 \times 10^4$ |
| Low | 867 | 725.2 |

Table 7 shows the corrosion resistance of samples mineralized as above and heated at different temperatures for one hour. Increasing the drying temperature typically increases the average resistance.

TABLE 7

Comparison of resistance for samples mineralized in 1:8 sodium silicate and heated at different post-deposition temperatures. Resistance ($\Omega$-cm$^2$) in pH 4, 0.5 M Na$_2$SO$_4$.

| Location | 100° C. | 125° C. | 150° C. | 175° C. | 200° C. |
|---|---|---|---|---|---|
| 1 | $4.4 \times 10^4$ | 702.9 | $8.2 \times 10^4$ | $1.2 \times 10^5$ | $2.1 \times 10^5$ |
| 2 | $4.7 \times 10^4$ | $6.8 \times 10^4$ | $8.4 \times 10^4$ | 1600 | 780.7 |
| 3 | 725.2 | $4.0 \times 10^4$ | 1644.3 | $8.2 \times 10^4$ | $2.3 \times 10^4$ |
| Avg. | $3.1 \times 10^4$ | $3.5 \times 10^4$ | $5.6 \times 10^4$ | $6.8 \times 10^4$ | $7.8 \times 10^4$ |
| High | $4.7 \times 10^4$ | $6.8 \times 10^4$ | $8.4 \times 10^4$ | $1.2 \times 10^5$ | $2.1 \times 10^5$ |
| Low | 725.2 | 702.9 | 1644.3 | 1600 | 780.7 |

The samples of Table 8 were placed under water for seven days, and the corrosion resistance determined periodically. As shown in Table 8, the resistance drops to less than 1000 $\Omega$-cm$^2$ for all the samples after seven days. Without wishing to be bound by any theory of explanation it is believed that water can penetrate through microcracks in the coating and attacks the underlying layer. The dissolution of Zn can lead to the removal of the protective coating and eventually causes the corrosion rate to increase.

TABLE 8

Comparison of resistance after 1 week immersed in water for surfaces mineralized in 1:8 sodium silicate. Resistance ($\Omega$-cm$^2$) in pH 4, 0.5 M Na$_2$SO$_4$.

| No. of days | 100° C. | 125° C. | 150° C. | 175° C. | 200° C. |
|---|---|---|---|---|---|
| Initial | $3.1 \times 10^4$ | $3.6 \times 10^4$ | $6.0 \times 10^4$ | $6.5 \times 10^4$ | $8.1 \times 10^4$ |
| 1 day | 822.8 | 844.1 | 1240.5 | 1521.6 | 1623.5 |
| 4 days | 580.1 | 612.5 | 800.2 | 911.3 | 954 |
| 7 days | 400.1 | 512.3 | 564.7 | 603.1 | 625.4 |

Table 9 presents corrosion resistance data for samples mineralized in different concentrations of silicate solution. In this example, a series of bath solutions having differing ratios of PQ solution to water were prepared. For example, a 1:1 solution was prepared by adding 1 part PQ solution to 1 part water. Following mineralization, the samples were heated at 100° C. for 1 hour. Data representative of the results achieved are given below. One of skill in the art should understand and appreciate that the corrosion resistance generally increases with bath concentration. With the 1:8 and the 1:4 baths, the corrosion resistance appears to be variable across the surface. However, with the 1:3 ratio bath and higher ratio baths, resistances in the range of $10^5$ $\Omega$-cm$^2$ are measured across the surface. Thus one of skill in the art should conclude that the 1:3 is a desirable bath concentration for these samples.

TABLE 9

Comparison of resistance for surfaces mineralized in different concentrations of sodium silicate solution. Resistance ($\Omega$-cm$^2$) in pH 4, 0.5 M Na$_2$SO$_4$

| Location | 1:8 | 1:4 | 1:3 | 1:2 | 1:1 |
|---|---|---|---|---|---|
| 1 | $4.4 \times 10^4$ | 8200 | $3.3 \times 10^5$ | $7.7 \times 10^5$ | $2.2 \times 10^6$ |
| 2 | $4.7 \times 10^4$ | $1.7 \times 10^5$ | $1.8 \times 10^5$ | $1.2 \times 10^6$ | $1.8 \times 10^6$ |
| 3 | 725.2 | $3.0 \times 10^5$ | $4.9 \times 10^5$ | $1.3 \times 10^6$ | $1.9 \times 10^6$ |
| Avg. | $3.1 \times 10^4$ | $6.9 \times 10^4$ | $3.3 \times 10^5$ | $1.1 \times 10^6$ | $2.0 \times 10^6$ |
| High | $4.7 \times 10^4$ | $3.0 \times 10^5$ | $4.9 \times 10^5$ | $1.3 \times 10^6$ | $2.2 \times 10^6$ |
| Low | 725.2 | 8200 | $1.8 \times 10^5$ | $7.7 \times 10^5$ | $1.8 \times 10^6$ |

Samples mineralized in 1:3 sodium silicate were heated at different temperatures for 1 hour and kept under water for seven days. As shown in Table 10, the resistances measured immediately after drying, indicate that increasing drying temperature tends to increase the average resistance of the samples. However, the resistances of all the samples can drop to under 1000 W-cm2 after seven days immersed in water.

TABLE 10

Comparison of resistance after 1 week immersed in water for surfaces mineralized in 1:3 sodium silicate and heated at various temperatures for 1 hour. Resistance ($\Omega$-cm$^2$) in pH 4, 0.5 M Na$_2$SO$_4$.

| Location | Room temp. | 100° C. | 125° C. | 150° C. | 175° C. | 200° C. |
|---|---|---|---|---|---|---|
| 1 | 2246 | $3.3 \times 10^5$ | $7.1 \times 10^5$ | $7.2 \times 10^5$ | $3.2 \times 10^5$ | $8.0 \times 10^5$ |
| 2 | 1879 | $1.8 \times 10^5$ | $6.8 \times 10^5$ | $8.4 \times 10^5$ | $1.2 \times 10^6$ | $1.5 \times 10^6$ |
| 3 | 2224 | $4.9 \times 10^5$ | $1.4 \times 10^5$ | $4.8 \times 10^5$ | $9.2 \times 10^5$ | $1.0 \times 10^6$ |
| Avg. | 2116.2 | $3.3 \times 10^5$ | $5.1 \times 10^5$ | $6.8 \times 10^5$ | $8.1 \times 10^5$ | $1.1 \times 10^6$ |
| High | 2246 | $4.9 \times 10^5$ | $7.8 \times 10^5$ | $8.4 \times 10^5$ | $1.2 \times 10^6$ | $1.5 \times 10^6$ |
| low | 1879 | $1.8 \times 10^5$ | $1.4 \times 10^5$ | $4.8 \times 10^5$ | $3.2 \times 10^5$ | $8.0 \times 10^5$ |

TABLE 11

Comparison of resistance after immersion in water for surfaces mineralized in 1:3 sodium silicate and heated at various temperatures for 1 hour. Resistance ($\Omega$-cm$^2$) in pH 4, 0.5 M Na$_2$SO$_4$.

| Days | Room temp. | 100° C. | 125° C. | 150° C. | 175° C. | 200° C. |
|---|---|---|---|---|---|---|
| Initial | 2116.2 | 3.5 × 10$^5$ | 5.0 × 10$^5$ | 6.8 × 10$^5$ | 8.4 × 10$^5$ | 1.3 × 10$^6$ |
| 1 | 632.1 | 2247.8 | 2509 | 2496.2 | 3561.3 | 3626 |
| 4 | 601.1 | 1028.2 | 978 | 856.3 | 1211.3 | 1490.4 |
| 7 | 580 | 532.1 | 612.3 | 632.6 | 657.7 | 691.9 |

The dried samples can be rinsed to remove any water soluble species. If desired, the rinse solution can comprise at least one composition for further modifying the dried sample (e.g., silanes, colloidal silica, among other materials).

EXAMPLE 4

Hydrogen is evolved at the surface of the cathode during electroplating and the rate of hydrogen evolution can be controlled by varying the applied potential or current. Hydrogen production also releases hydroxyl groups into the solution thereby increasing pH. However, in the case of electroless deposition, this can be accomplished through the use of selected reducing agents.

Figure 9:
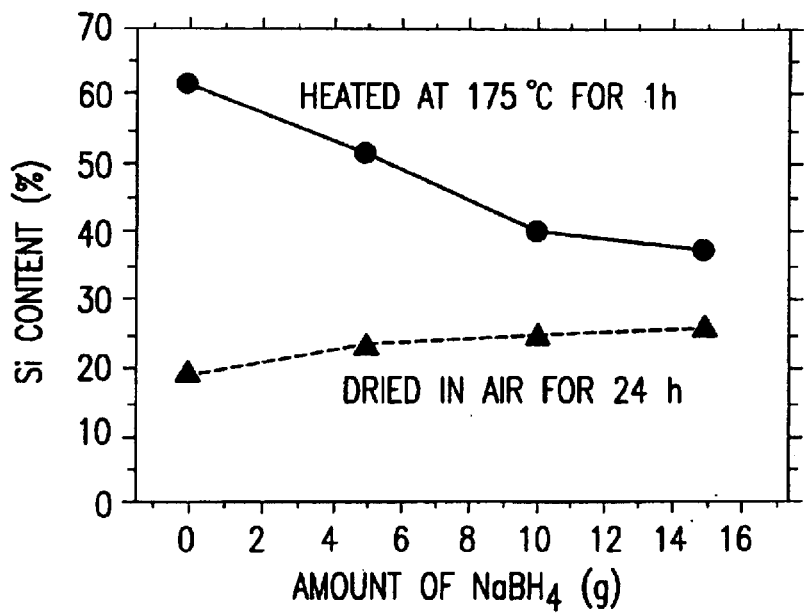
FIG. 9 illustrates a comparison of increasing amounts of sodium borohydride addition to the inventive medium.

FIG. 9 presents the Si concentration of samples mineralized in 1500 mL of 1:3 sodium silicate in the presence of increasing amounts of sodium borohydride. Comparison of the samples dried in air with the samples heated at 175 C. is shown. With samples dried in air, the Si content increases with borohydride concentration. With the heated samples, the Si content initially decreases with borohydride concentration, but no decrease is observed at borohydride concentrations greater than 5 g.

Figure 10:
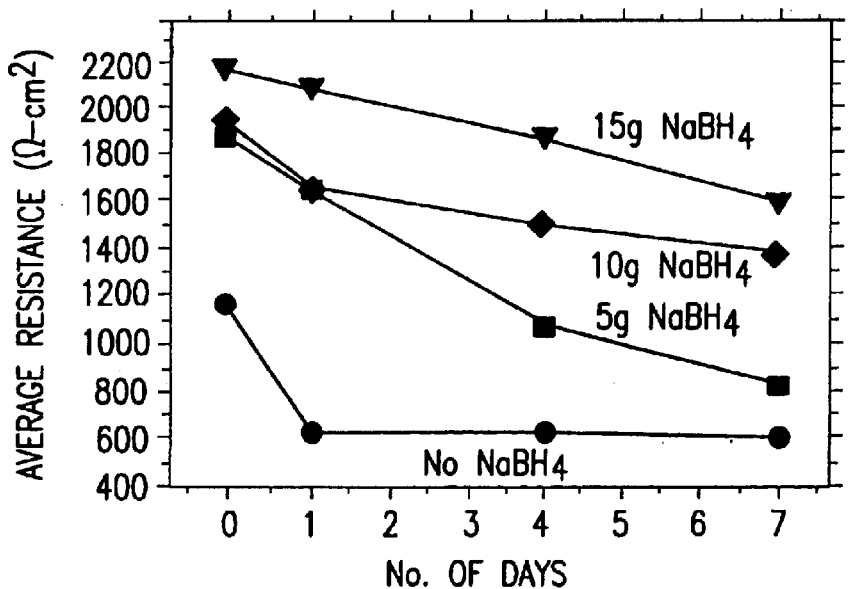
FIG. 10 illustrates a comparison of corrosion resistance of samples treated with the inventive medium with sodium borohydride addition.

The stability of the coatings prepared without post-deposition heating is shown in Table 12 (note as shown above post-deposition heating improves corrosion resistance). The stability of the coatings is improved by the addition of sodium borohydride. The corrosion resistance of the coatings prepared with 10 g of sodium borohydride drops from 1941.5 W-cm2 to 1372.1 W-cm2 after seven days, whereas the resistance of coating prepared in the absence of sodium borohydride drops from 2116.2 W-cm2 to 580 W-cm2. FIG. 10 shows a plot of this data.

TABLE 12

Comparison of resistance after immersion in water for surfaces mineralized in 1500 mL of 1:3 sodium silicate in the presence of various amounts of sodium borohydride. Resistance ($\Omega$-cm$^2$) in pH 4, 0.5 M Na$_2$SO$_4$.

| Days immersion | No NaBH$_4$ | 5 g NaBH$_4$ | 10 g NaBH$_4$ | 15 g NaBH$_4$ |
|---|---|---|---|---|
| Initial | 2116.2 | 1870.1 | 1941.5 | 2168.9 |
| 1 | 632.1 | 1650.7 | 1660.2 | 2071.7 |
| 4 | 601.1 | 1072.1 | 1491.8 | 1856.2 |
| 7 | 580 | 830.1 | 1372.1 | 1590.1 |

Figure 11:
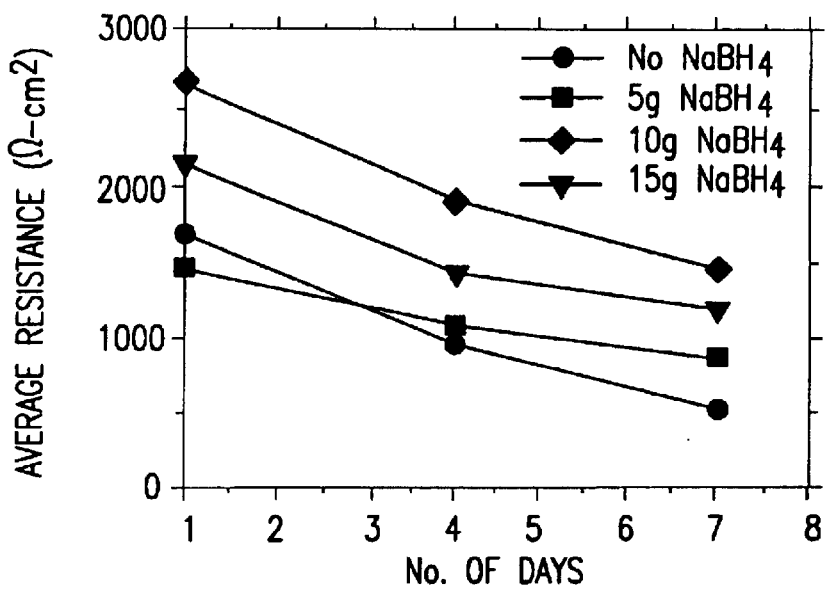
FIG. 11 illustrates a comparison of corrosion resistance of samples treated with the inventive medium with sodium borohydride addition and a thermal post-treatment.

A similar trend is observed with samples subjected to post-mineralization heating at 175° C. for one hour. The average resistance of the coating prepared using 10 g of sodium borohydride drops to 1488.6 W-cm2 after seven days, compared to 570.7 W-cm2 observed after seven days for the coating prepared in the absence of sodium borohydride (Table 13). A plot of this data is shown in FIG. 11.

TABLE 13

Comparison of resistance after immersion in water for surfaces mineralized in 1500 mL of 1:3 sodium silicate in the presence of various amounts of sodium borohydride and heated at 175° C. for one hour. Resistance ($\Omega$-cm$^2$) in pH 4, 0.5 M Na$_2$SO$_4$

| Days immersion | No NaBH$_4$ | 5 g NaBH$_4$ | 10 g NaBH$_4$ | 15 g NaBH$_4$ |
|---|---|---|---|---|
| Initial | 3.3 × 10$^5$ | 4.1 × 10$^4$ | 1.9 × 10$^4$ | 3456 |
| 1 | 1690.4 | 1488.6 | 2677.8 | 2131.2 |
| 4 | 983.1 | 1132.4 | 1939.0 | 1446.7 |
| 7 | 570.7 | 916.1 | 1488.6 | 1243.1 |

Figure 12:
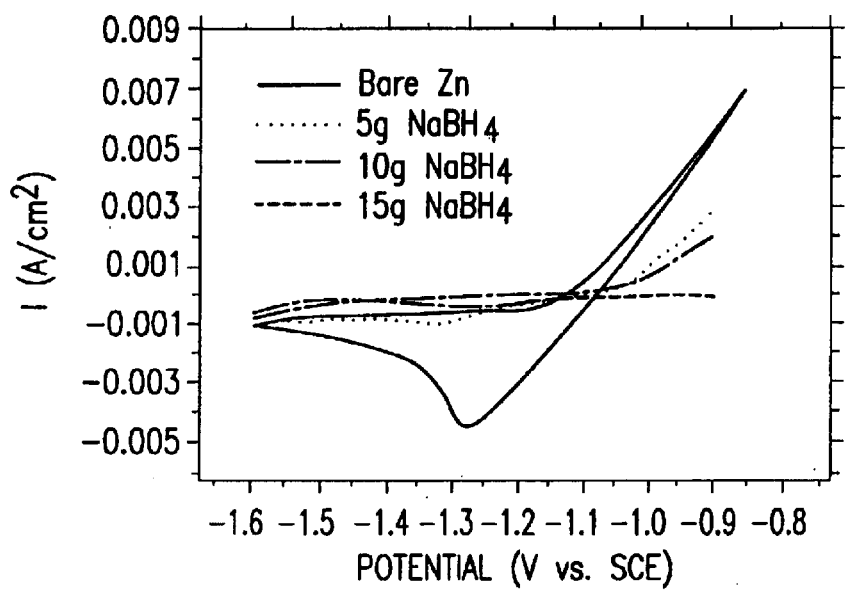
FIG. 12 illustrates a voltagrams for samples treated in the inventive medium with sodium borohydride addition.

Surfaces mineralized in 1500 mL of 1:3 sodium silicate in the presence of different amounts of sodium borohydride were used as working electrodes for cyclic voltammetry in a three electrode cell, using a calomel reference electrode and a scan rate of 5 mV/s. One set of surfaces was dried in air for 24 hours, while a second set was heated at 175° C. for one hour. FIG. 12 shows voltamograms for the air dried samples. The observed current corresponds to corrosion of the surface layer. At a bare galvanized surface, increasing the potential more positive than −1.1 V leads to stripping Zn from the surface. In the reverse scan, deposition is observed as mass transfer limited current.

For the SiO$_2$-coated surfaces, peak reduction current and maximum oxidation current can decrease rapidly. Since the currents are dependent of the amount of material lost from the surface, the inhibiting efficiency of the silica on Zn can be estimated from the voltammograms as:

Inhibiting efficiency (%)=[(Peak Current Coated)/(Peak Current Bare)]×100

Figure 13:
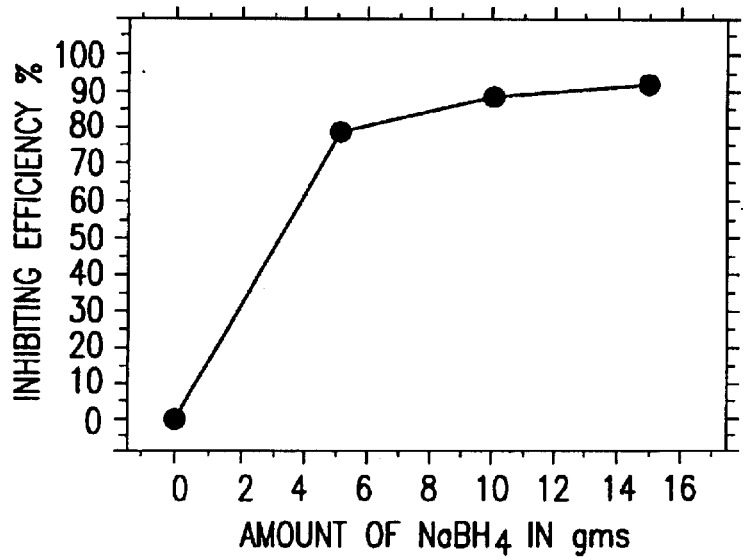
FIG. 13 illustrates inhibiting efficiencies based upon the voltagrams of FIG. 12.

FIG. 13 shows a plot of the inhibiting efficiencies from the voltammogram of FIG. 12. The inhibiting efficiency typically increases with increasing sodium borohydride concentration.

Figure 14:
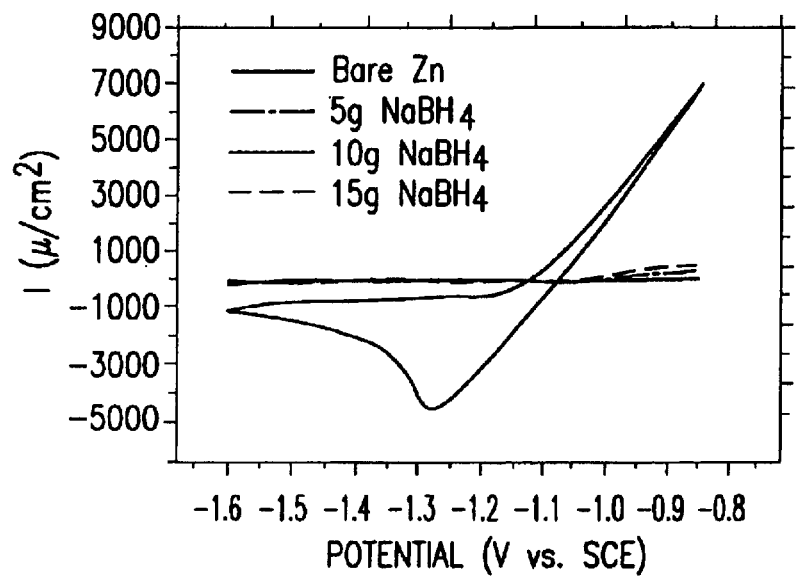
FIG. 14 illustrates a voltagrams for samples treated in the inventive medium with sodium borohydride addition and a thermal post-treatment.
Figure 15:
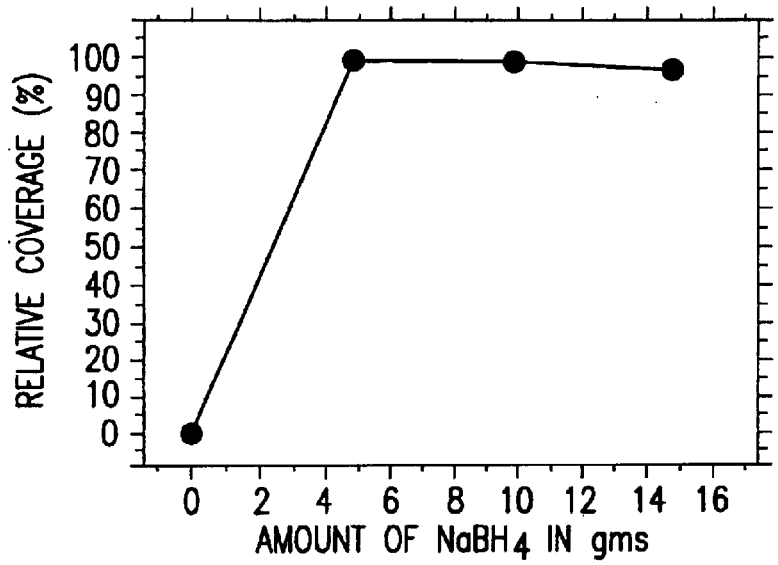
FIG. 15 illustrates inhibiting efficiencies based upon the voltagrams of FIG. 14.

Voltammograms of the surfaces coated in the presence of sodium borohydride and heated at 175° C. for one hour are shown in FIG. 14. Currents in the SiO$_2$-Coated samples are negligible compared to the bare surface. The inhibiting efficiency is shown in FIG. 15.

Figure 16:
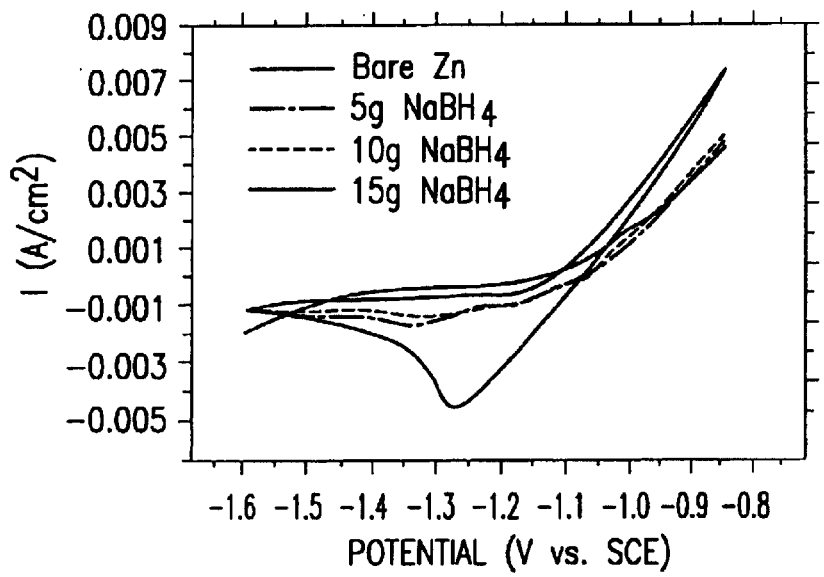
FIG. 16 illustrates cyclic voltagrams for samples treated in the inventive medium with sodium borohydride addition.
Figure 19:
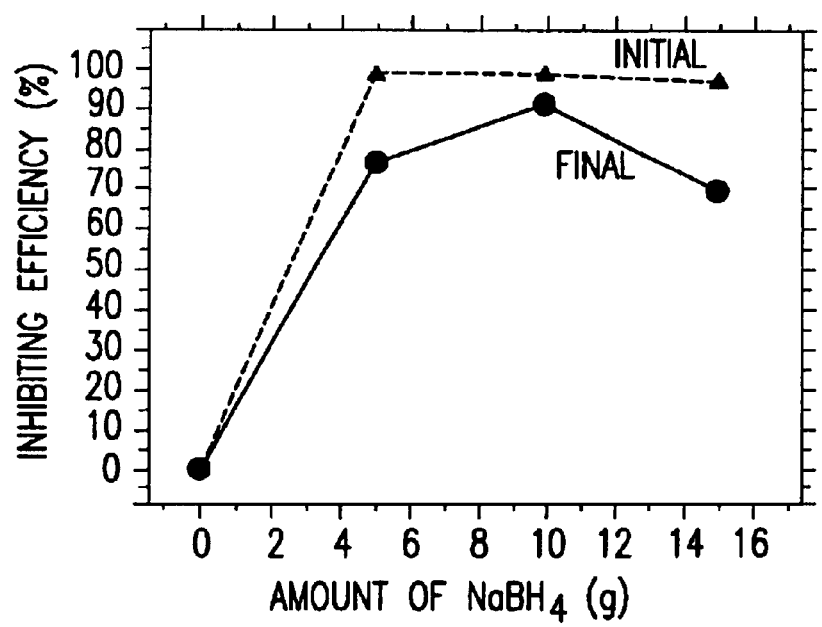
FIG. 19 illustrates the affect on inhibiting efficiencies on samples having a thermal post-treatment after immersion in water for one week.

Cyclic voltammetry (CV) was performed with surfaces with and without post-mineralization heating after immersing them in water for one week. FIG. 16 shows the CVs of the samples prepared in the presence of different amounts of sodium borohydride and air-dried for 24 hours. The current increases to the order of 1 mA after one week. FIG. 17 shows the decrease in the inhibiting efficiency after one week immersion in water. Similar results are observed for the surfaces subjected to post-deposition heating at 175° C. for one hour (FIGS. 18 and 19). The change in inhibiting efficiency is the lowest for samples prepared with 10 g of sodium borohydride.

Figure 21:
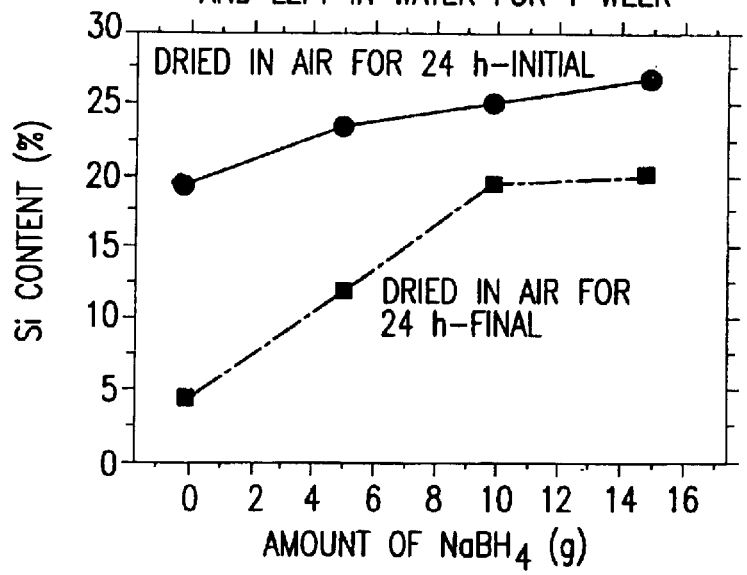
FIG. 21 illustrates an EDAX of samples treated with the inventive medium with sodium borohydride addition.
Figure 22:
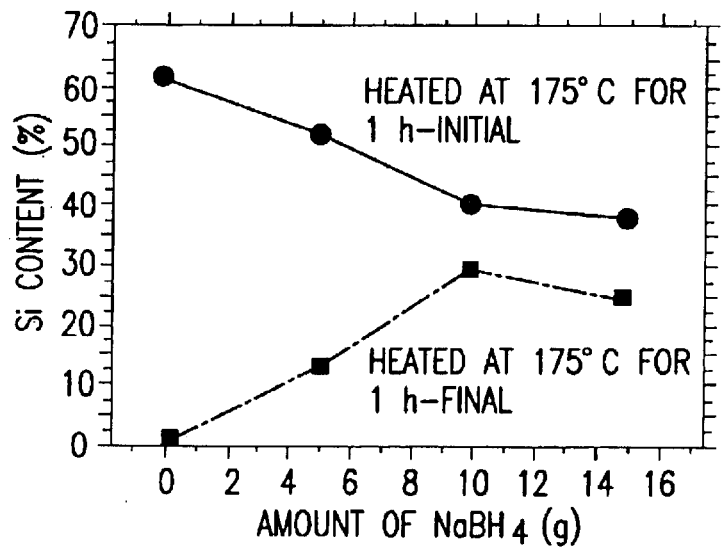
FIG. 22 illustrates an EDAX of samples treated with the inventive medium with sodium borohydride addition and a thermal post treatment.

FIG. 20 shows SEM images of surfaces prepared in the presence of 10 g of sodium borohydride before and after immersion in water. Upon inspection one of skill in the art should notice that a 2 μm crack is observed. It will be appreciated by such a skilled artisan that such cracks facilitate the entry of water through the coating and allow attack of the underlying surface. As the cracks become large, to the order of 8–10 mm and flakes of zinc appear on the surface. EDAX on surfaces coated in the presence of different amounts of sodium borohydride and left to dry in air for 24 hours indicates that the Si content drops for all the samples, but the drop is the least for the sample prepared in the presence of 10 g of sodium borohydride (FIG. 21). Similar behavior is observed for surfaces prepared with post-deposition heating (FIG. 22).

These studies indicate to one of skill in the art that surfaces coated via electroless mineralization in the presence of sodium borohydride.

EXAMPLE 5

The following table shows examples of the inventive process that employs a heated silicate medium for treating standard M-10 bolts. The heated silicate medium comprised 10% N-Grade PQ sodium silicate solution (which comprises 2.88% SiO2, 0.90% alkali) and silica colloids that ranged in size from about 10 nm to about 1,000 nanometers (and typically 1 to 100 nm).

POST-TREATMENT/TOPCOATS

| Group # | Run# | Post-Treat. | Top-Coat |
|---|---|---|---|
| 1A | 2 | Dry Only | None |
| 1B | 3 | Dry Only | None |
| 2 | 3 | Dry Only | Magni ® B17 |
| 3 | 2 | Dry Only | Magni ® B18 |
| 4A | 5 | A Process | None |
| 4B | 6 | A Process | None |
| 5 | 6 | A Process | Magni ® B17 |
| 6 | 5 | A Process | Magni ® B18 |
| 7A | 1 | A Process | None |
| 7B | 4 | A Process | None |
| 8 | 4 | A Process | Magni B ®17 |
| 9 | 1 | A Process | Magni ® B18 |
| 10 | 7/8 | Corrosil | None |
| 11 | 7/8 | Corrosil | Magni ® B17 |
| 12 | 7/8 | Corrosil | Magni ® B18 |
| 13 | 7/8 | Ecotri | None |
| 14 | 7/8 | Ecotri | Magni ® B17 |
| 15 | 7/8 | Ecotri | Magni ® B18 |
| 16 | 9 | Dry Only | None |
| 17 | 9 | A Process | None |

STANDARD M-10 BOLT RUN PARAMETER SUMMARIES

| Run # | Time (Min) | Bath Temp (C) | CD (ASI) | Number A:C Area | Of Bolts | Total Bolt Area (sq. In) | D.C. Current (A) | D.C. Potential (V) | Results |
|---|---|---|---|---|---|---|---|---|---|
| 1 | 15 | 74.3–75.8 | 0.055 | 1–1.9 | 100 | 500 | 28 | 10.7–15.0 | Bright & Silvery Appearance |
| 2 | 0 | N/A | 0 | 0 | 100 | 500 | 0 | 0 | Eclipse Zinc Plate Control |
| 3 | 0 | N/A | 0 | 0 | 100 | 500 | 0 | 0 | Eclipse Zinc Plate Control |
| 4 | 15 | 74.6–75.5 | 0.055 | 1:1.9 | 100 | 500 | 27.5 | 10.9–12.3 | Bright & Silvery Appearance |
| 5 | 15 | 71.3–74.5 | 0 | 0 | 100 | 500 | 0 | 0 | Hot Soak |
| 6 | 15 | 72.8–75.1 | 0 | 0 | 100 | 500 | 0 | 0 | Hot Soak |
| 7 | 0 | N/A | 0 | 0 | 100 | 500 | 0 | 0 | Eclipse Zinc Supplied by Atotech ® |
| 8 | 0 | N/A | 0 | 0 | 100 | 500 | 0 | 0 | Eclipse Zinc Supplied by Atotech ® |
| 9 | 15 | 36.3–37.1 | 0 | 0 | 68 | 340 | 0 | 0 | Cold Soak |
| 10 | 15 | 74.5–75.6 | 0 | 0 | 22 | 110 | 0 | 0 | Hot Soak |
| 1 | 0 | N/A | 0 | 0 | 6 | 30 | 0 | 0 | Zinc Plate Control |
| 2 | 15 | 26.6 | 0 | 0 | 23 | 115 | 0 | 0 | Cold Soak |
| 3 | 15 | 74.3–75.6 | 0 | 0 | 24 | 120 | 0 | 0 | Hot Soak |
| 4 | 2.5 | 73.1–74.9 | 0.1 | 1:1 | 53 | 265 | 27 | <24.7 | Bright & Silvery Appearance |
| 5 | 15 | 24.6 | 0 | 0 | 9 | 45 | 0 | 0 | Cold Soak/New Solution |
| 6 | 15 | 73–75 | 0 | 0 | 9 | 45 | 0 | 0 | Hot Soak/New Solution |
| 7 | 15 | 74.5–75.2 | 0 | 0 | 6 | 30 | 0 | 0 | Hot Soak |

-continued

POST-TREATMENT/TOPCOATS

| Group # | Run# | Post-Treat. | Top-Coat | |
|---|---|---|---|---|
| 18 | 9 | A Process | Magni ® B17 | |
| 19 | 9 | A Process | Magni B®18 | |
| 20 | 10 | A Process | None | |
| 1 | 1 | Dry Only | None | |
| 2 | 2 | Dry, Rinse, Dry | None | |
| 3 | 3 | Dry, Rinse, Dry | None | |
| 4 | 4 | Dry, Rinse, Dry | None | |
| 5 | 5 | Immediate Rinse | None | New Solution: |
| 6 | 5 | Dry, Rinse, Dry | None | New Solution: |
| 7 | 6 | Immediate Rinse | None | New Solution: |
| 8 | 6 | Dry, Rinse, Dry | None | New Solution: |
| 9 | 7 | Spin Dry Only | None | Ripened Solution |
| 10 | 6 | Spin Dry Only | None | New Solution: |

A Process
1. 90 Sec. Spin Dry
2. 10 sec. De-Ionized Water Rinse
3. 60 Sec. Spin Dry
4. 10 Sec. A1 Silane Rinse
5. 60 Sec. Spin Dry
6. 10 Sec. A2 Silane Rinse
7. 90 Sec. Spin Dry
Corrosil & Ecotri Treatments
Applied By Atotech
Topcoats ~0.2 mil thickness
Notes:
1. Temperature on all runs maintained 74–77 C
2. All runs performed in a Sterling Model 612 plating barrel at 11–12 rpm
3. All runs performed with a 265 square inch platinum coated niobium mesh anode positioned in a semi-circular position around the plating barrel, 1.5 inches from the exterior of the barrel
4. RA = only a spin dry(90 Seconds) after electrolytic treatment and salt spray testing delayed ~24 Hours
5. RB = 90 sec spin dry, 10 sec. Deioized water rinse, 90 sec spin dry and salt spray testing delayed ~24 Hours
6. RC = 90 sec spin dry, 10 sec. Deioized water rinse, 90 sec spin dry and salt spray testing within 2 Hours
7. A1 Silane: 88.137% water, 0.063% 7-Diethylamino-4-methylcoumarin [UV dye], 9.8% Denatured alcohol, 2% Bis(Triethyoxysilyl) Ethane [silane]
8. A2 Silane: same as A1 except silane component comprises 2-(3,4-Epoxycyclohexyl)-Ethyltrimethoxysilane
9. New Solution = Solution without exposure to current and having colloids in size ranging from about 10 to 100 nm.
10. Ripened Solution = Solution with significant exposure to current and having colloids is size ranging from about 10 to 1,000 micrometers.

Upon review of the above representative data and information, one of skill in the art should understand and appreciate that the process of the present invention can be carried out in a routine manner on industrial parts and workpieces using standard metal finishing equipment. It should also be appreciated that the mineralized samples can be further treated with a top coat or other additional protective coating to aid in the handling and transport of the mineralized parts or workpieces.

EXAMPLE 6

The present example illustrates the effect of post-treatment heating of the samples. The edge of a 2.75 inch diameter×6 inch long electric motor laminate core assembly comprising individual laminates (high silicon steel alloy) mechanically coined together and assembled onto a simulated shaft was treated. These laminates can be used from constructing the rotor of an electric motor. Mineralization was carried out in a 1:3 ratio bath made of 1 part sodium silicate (PQ) solution and 3 parts water. The temperature of the bath was maintained at 75 C. and a deposition time of 15 minutes. Post treatment heating of the samples was carried out at 25 C. until the sample was dry and 175 C. until the sample was dry.

Data representative of the corrosion resistance ($\Omega$-cm$^2$) in pH 4, 0.5 M Na$_2$SO$_4$ Solution of the samples mineralized in a 1:3 PQ Bath at pH 10.5 for 15 minutes is given below

| Location | 25 C dry | 120 C dry |
|---|---|---|
| 1 | 1087.8 | 38146 |
| 2 | 2222.1 | 61923 |
| 3 | 1600 | 48083 |
| Average Value | 1636.6 | 49384 |

Data representative of the corrosion resistance ($\Omega$-cm$^2$) in pH 4, 0.5 M Na$_2$SO$_4$ Solution of the samples mineralized in Mineralize in 1:3 PQ Bath with NaBH$_4$ (10 g/l), at pH 10.5 for 15 minutes is given below

| Location | 25 C dry | 120 C dry |
|---|---|---|
| 1 | 6883.2 | 26961 |
| 2 | 15108 | 27049 |
| 3 | 7711.4 | 24858 |
| Average Value | 9900.9 | 26289 |

EDAX analysis of the samples dried at 25 C. and prepared in the NaBH$_4$ containing bath is compared to the samples prepared without the NaBH$_4$ gave the following exemplary data:

| | NaBH$_4$ Bath | Control (no NaBH$_4$) |
|---|---|---|
| Atomic % | | |
| Oxygen | 0.000 | 0.000 |
| Silicon | 55.187 | 42.329 |
| Iron | 44.813 | 57.671 |
| Conc. (Wt %) | | |
| Oxygen | 0.00 | 0.000 |
| Silicon | 38.247 | 26.960 |
| Iron | 61.753 | 73.040 |

Upon review of the above exemplary data, one of skill in the art should understand and appreciate that the inclusion of NaBH$_4$ into the mineralization bath substantially increases the mineralized protective layer formed.

Examples 7–9 illustrate silicate media containing complexing agents and dopants. These silicate media were prepared in laboratory scale equipment.

EXAMPLE 7

20 gms of sodium citrate dihydrate (complexing agent), 1 gm Nickel chloride (dopant), 1 gm Molybdenum (dopant), and 1 gm cobalt chloride (dopant) were dissolved in 500 ml of water to prepare a first solution. Then and 0.5 gm of MgO and 1 gm aluminum dissolved in 1:3 sodium silicate solution (supplied by PQ) which when added to the 500 ml water makes up 1:3 bath to prepare a second solution. The first and second solutions were combined. The combined solution had a violet hue and pH of about 11.5.

EXAMPLE 8

20 gms of sodium citrate dihydrate, 1 gm nickel chloride, 1 gm cobalt chloride, and 0.5 gm molybdenum were dissolved in 500 ml of water in order to prepare a first solution. Then a second solution of 1:3 sodium silicate was prepared. The first and second solutions were combined. The combined solutions had a violet hue and pH of about 11.0.

EXAMPLE 9

20 gms of Sodium citrate dihydrate, 1 gm Nickel chloride, 0.5 gm Molybdenum, and 1 gm cobalt chloride were dissolved in 500 ml of water in order to prepare a first solution. A second solution comprising 1:3 sodium silicate was prepared. The first and second solutions were combined.

If desired a reducing agent solution comprising sodium borohydride (e.g., 4 grams of sodium borohydride dissolved in 50 ml water) can be added to solutions of Examples 7–9.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention.

The following is claimed:

1. An electroless method for treating a substrate having an electronically conductive surface comprising:

contacting at least a portion of the surface with a medium comprising water, colloidal silica and at least one silicate and having a basic pH and a temperature greater than about 50° C. and wherein said medium is substantially free of chromates, drying the substrate, and rinsing the substrate.

2. The method of claim 1 wherein the medium further comprises at least one member selected from the group consisting of stabilizers and reducing agents.

3. The method of claim 1 wherein the medium comprises water, sodium silicate and colloidal silica.

4. The method of claim 1 wherein the surface comprises at least one member selected from the group consisting of copper, nickel, tin, iron, zinc, aluminium, magnesium, stainless steel and steel and alloys thereof.

5. The method of claim 1 wherein said rinsing comprises contacting the surface with a second medium comprising a combination comprising water and at least one water soluble compound selected from the group consisting of carbonates, chlorides, fluorides, nitrates, zironates, titanates, sulphates, water soluble lithium compounds and silanes.

6. The method of claim 1 wherein the medium further comprises at least one dopant selected from the group consisting of zinc, cobalt, molybdenum and nickel.

7. The method of claim 1 wherein said drying is conducted at a temperature of at least about 120° C.

8. The method of claim 1 further comprising drying the substrate and applying at least one coating upon the surface after said rinsing.

9. The method of claim 2 wherein the medium comprises at least one stabilizer selected from the group consisting of citrates, amines and acetic acids.

10. The method of claim 1 wherein said method forms a layer comprising silica upon the surface.

11. The method of claim 1 wherein said medium comprises sodium silicate, water, colloidal silica and at least one dopant, said rinsing is conducted with a second medium comprising water and at least one member selected front the group consisting of silanes and colloidal silica and wherein the method further comprises drying the substrate after rinsing and applying at least one secondary coating comprising at least one member selected from the group consisting of acrylics, urethanes, polyester and epoxies.

12. The method of claim 1 wherein said rinsing comprises contacting said surface with a solution comprising water and at least one dopant.

13. The method of claim 12 wherein the dopant comprises at least one member selected from the group consisting of molybdenum, chromium, titanium, zirconium, vanadium, phosphorus, aluminum, iron, boron, bismuth, gallium, tellurium, germanium, antimony, niobium, magnesium, manganese, zinc, aluminum, cobalt, nickel and their oxides and salts.

14. The method of claim 2 wherein said medium further comprises at least one reducing agent selected from the group consisting of sodium borohydride and hypophosphide.

15. The method of claim 4 wherein the surface comprises at least one of zinc and zinc alloys.

16. The method of claim 13 wherein said solution comprises water and said at least one dopant comprises magnesium.

17. The method of claim 5 wherein the second medium comprises water and at least one silane.

18. An electroless method for treating a metallic or an electrically conductive surface comprising:

exposing at least a portion of the surface to a medium comprising a combination comprising water, colloidal silica, and at least one water soluble silicate wherein said medium has a basic pH, drying the surface, rinsing the surface, drying the surface; and contacting the surface with at least one composition that adheres to the treated surface.

19. The method of claim 18 wherein said medium further comprises at least one dopant selected from the group consisting of titanium chloride, tin chloride, zirconium acetate, zirconium oxychloride, calcium fluoride, tin fluoride, titanium fluoride, zirconium fluoride, ammonium fluorosilicate, aluminum nitrate, magnesium sulphate, sodium sulphate, zinc sulphate, copper sulphate, lithium acetate, lithium bicarbonate, lithium citrate, lithium metaborate, lithium vanadate and lithium tungstate.

20. The method of claim 18 further comprising prior to said exposing contacting said surface with a pretreatment comprising at least one member selected from the group consisting of acid and basic cleaners.

21. The method of claim 18 wherein said medium further comprises at least one dopant.

22. The method of claim 18 wherein said adherent composition comprises at least one member selected from the group consisting of latex, silanes, epoxies, silicone, amities, alkyds, urethanes, polyester and acrylics.

23. The method of claim 18 wherein the medium is heated to a temperature greater than about 50° C.

24. The method of claim 20 wherein said pretreatment comprises an acid cleaner.

25. A method for treating a substrate having an electrically conductive surface comprising:

contacting at least a portion of the surface with a medium comprising water, at least one silicate and at least one dopant selected from the group consisting of nickel, molybdenum, magnesium, aluminum, cobalt and water soluble salts thereof, and having a basic pH and wherein said medium is substantially free of chromates and has a temperature of at least about 50° C., and;

drying the substrate at a temperature greater than about 75° C.

26. The method of claim 25 wherein the medium comprises a combination comprising water, sodium silicate and at least one water soluble salt of nickel.

27. The method of claim 25 wherein the medium further comprises at least one reducing agent.

28. The method of claim 25 wherein the medium further comprises at least one stabilizer.

* * * * *